(12) United States Patent
Munter

(10) Patent No.: US 10,569,625 B1
(45) Date of Patent: Feb. 25, 2020

(54) APPARATUS AND METHOD FOR DISTRIBUTING A TARP OVER A CARGO ON A TRUCK LOAD BED

(71) Applicant: David R. Munter, Condon, MT (US)

(72) Inventor: David R. Munter, Condon, MT (US)

(*) Notice: Subject to any disclaimer, the term of this patent is extended or adjusted under 35 U.S.C. 154(b) by 50 days.

(21) Appl. No.: 16/018,242

(22) Filed: Jun. 26, 2018

Related U.S. Application Data

(63) Continuation-in-part of application No. 15/386,424, filed on Dec. 21, 2016, now Pat. No. 10,005,344, which is a continuation of application No. 14/748,096, filed on Jun. 23, 2015, now Pat. No. 9,555,696.

(51) Int. Cl.
*B60J 7/08* (2006.01)
*B60J 7/10* (2006.01)
*B60P 7/04* (2006.01)
*B66D 1/60* (2006.01)

(52) U.S. Cl.
CPC ............... *B60J 7/085* (2013.01); *B60J 7/102* (2013.01); *B60P 7/04* (2013.01); *B66D 1/60* (2013.01); *B60Y 2400/40* (2013.01)

(58) Field of Classification Search
CPC ... B60J 7/085; B60J 7/102; B66D 1/60; B60P 7/04; B60Y 2400/40
See application file for complete search history.

(56) References Cited

U.S. PATENT DOCUMENTS 9,555,696 B2 * 1/2017 Munter .................... B60J 7/085
10,005,344 B2 * 6/2018 Munter .................... B60J 7/085

* cited by examiner

*Primary Examiner* — D Glenn Dayoan
*Assistant Examiner* — Melissa Ann Bonifazi
(74) *Attorney, Agent, or Firm* — Glenn E. Gold, P.A.; Glenn E. Gold

(57) ABSTRACT

A mobile apparatus is used to distribute a tarp over a cargo loaded onto a trailer bed. An arch-shaped structure employing a pair of side members is mounted to a travel unit including a pair of carriage devices. Each carriage device is mounted for travel on an associated rail located at one of the sides of the trailer bed. Each side member is mounted to the pair of carriage devices at a respective pair of releasable pivot joints each located at one of the opposing ends of the side member. Each side member is available to pivot when the set of pivot joints associated with the other, non-pivoting side member is temporarily disabled. A pair of linear actuators drivingly coupled to the pair of side members is used to create a turning moment and induce the pivoting action.

20 Claims, 24 Drawing Sheets

APPARATUS AND METHOD FOR DISTRIBUTING A TARP OVER A CARGO ON A TRUCK LOAD BED

CROSS-REFERENCE TO RELATED APPLICATIONS

This U.S. non-provisional patent application is a continuation-in-part patent application of U.S. non-provisional patent application Ser. No. 15/386,424, issuing as U.S. Pat. No. 10,005,344 on Jun. 26, 2018, which, in-turn, claims the benefit of U.S. non-provisional patent application Ser. No. 14/748,096, having a filing date Jun. 23, 2015 (now issued as U.S. Pat. No. 9,555,696), both of which are incorporated by reference in their entirety to provide continuity of disclosure.

FIELD OF THE INVENTION

The present invention relates to covering cargo on trucks, and, more particularly, is directed to an apparatus and method for distributing a tarp over a cargo on a truck load bed.

BACKGROUND OF THE INVENTION

Many trucks have load beds for carrying a load of cargo thereon. The beds are open and accessible during loading and unloading of the cargo. However, during storage and/or transport of the cargo, the load is covered either to protect it from the elements or keep loose portions thereof from escaping from the load. A cover or tarp is, therefore, typically used to cover the cargo when in storage or during transport on the truck.

Tarps are frequently heavy and loads resting on the truck load beds oftentimes have irregular configurations making it extremely difficult for truck drivers or others to manually pull heavy tarps over the loads while climbing over them. Because of such difficulty, many accidents occur each year as truck driver's fall of their trucks while trying to tarp their load. Understandably insurance companies issuing policies that cover truckers hauling such loads of cargo build in high premiums in order to discourage such hazardous activity by truckers to manually cover loads in this manner. The same can be said for companies attempting to circumvent liability by forbidding truck drivers to tarp their cargo on company property. Thus, requiring them to drive off and tarp their load somewhere else.

Accordingly, there is a need in the art for an innovation that will provide a way to prevent the aforementioned hazardous activity by truckers from arising.

SUMMARY OF THE INVENTION

The present invention is directed to an innovation that overcomes the aforementioned problems that remain unsolved by providing an apparatus and method for distributing a tarp over a cargo on a truck load bed so as to eliminate the need for the trucker to undertake manual activity directed to covering up the cargo.

In one aspect of the present invention, a mobile assembly for use in drawing a covering at least partially over a load located on the bed of a transport vehicle trailer, includes:

a mobile conveyance system configured to selectively move along a longitudinal dimension of the transport vehicle bed;

a structure defining a clearance relative to the load and further defining a point of selectively attachable connection to the covering, the structure mounted to the conveyance system in an adjustable mounting relationship defined by a pair of selectively available pivoting axes; and an actuation system configured to selectively maneuver the structure such that the structure undergoes a pivoting motion.

In another aspect of the present invention, a mobile assembly for use in drawing a covering at least partially over a load located on the bed of a transport vehicle trailer, includes:

a pair of carriage devices each associated with a respective one of a pair of tracks each adjacent to and extending at least partially along a corresponding side of the transport vehicle bed, each one of the pair of carriage devices capable of travel along its respective associated track;

a pair of elongate, spaced-apart side members each having a pair of ends each pivotally connected to a corresponding one of the pair of carriage devices to define a corresponding selectively attachable pivoting connection;

at least one transverse member extending between the pair of side members; and an actuation system configured to selectively maneuver the pair of side members such that a selectable one of the pair of side members undergoes a pivoting motion.

In another aspect of the present invention, a method of distributing a covering over a freight loaded on the bed of a transport vehicle trailer, includes the steps of:

providing a frame structure that spans a lateral dimension of the trailer bed, the frame structure defining a clearance relative to the freight, the frame structure further defining a pair of selectable pivoting axes including a front first pivot axis enabling pivoting of the frame structure in a forward direction and a rear second pivot axis enabling pivoting of the frame structure in a rearward direction;

attaching the covering to the frame structure; and moving the frame structure along a longitudinal dimension of the bed to facilitate distribution of the covering over the freight.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
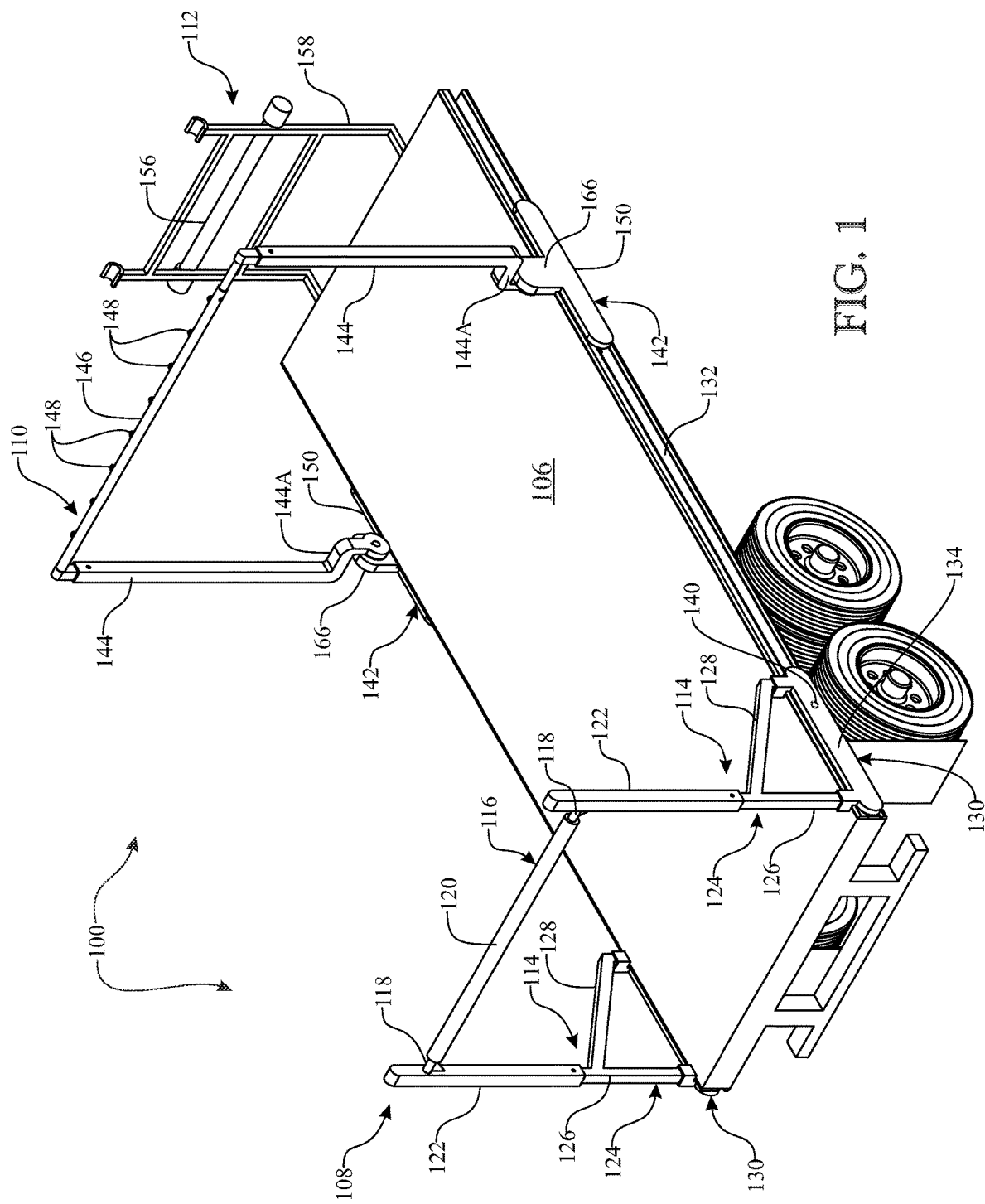
FIG. 1 presents a rear isometric view of an exemplary embodiment of a tarp distributing apparatus operatively mounted on a truck (or trailer) load bed.
Figure 2:
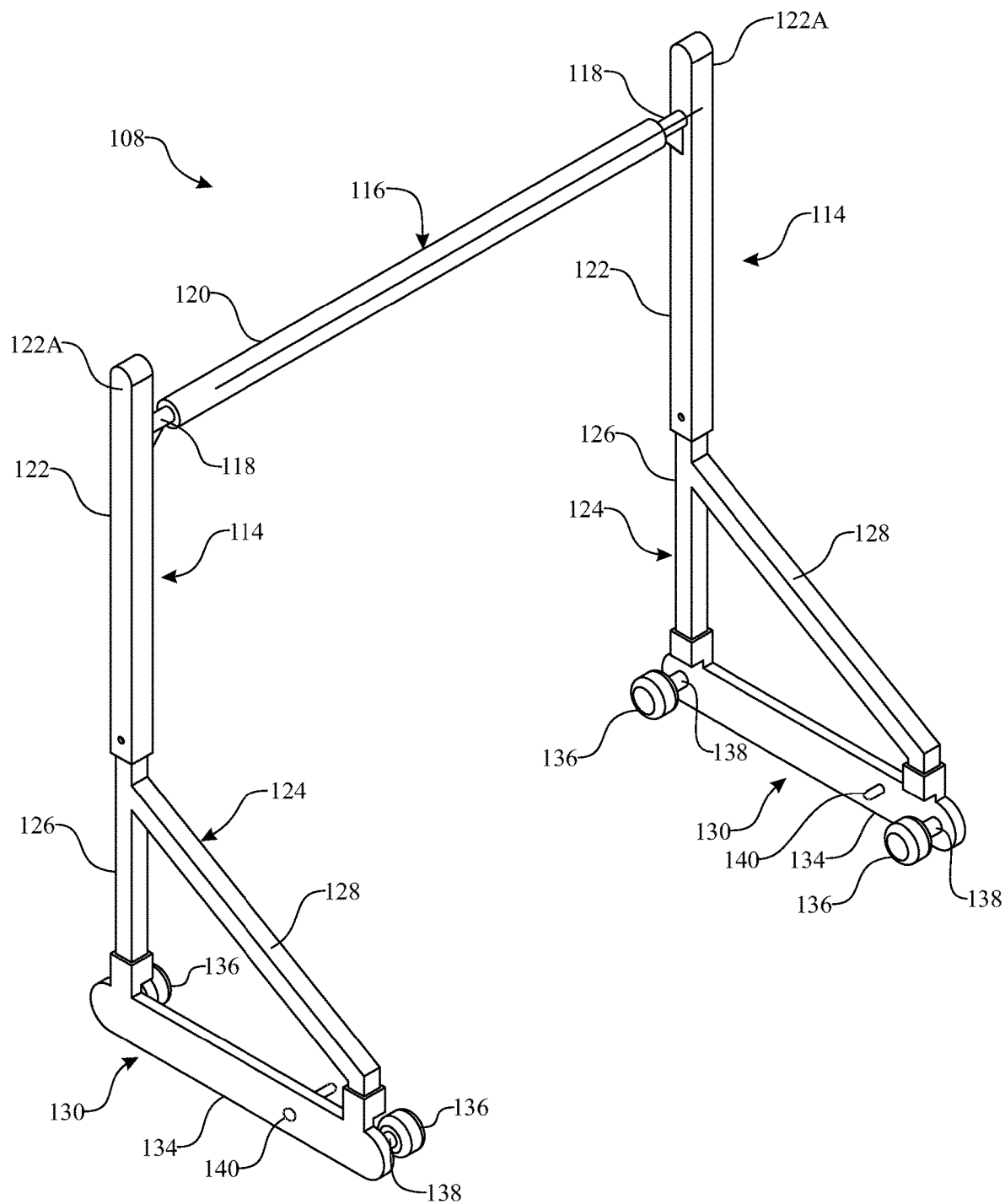
FIG. 2 presents a front isometric assembled view of a tarp guide device of the tarp distributing apparatus originally introduced in FIG. 1, the tarp guide device being mounted immobile and upright relative to a rear location on the truck load bed to establish the height to which a tarp can be moved to above and over the rear of a cargo on the truck load bed.
Figure 3:
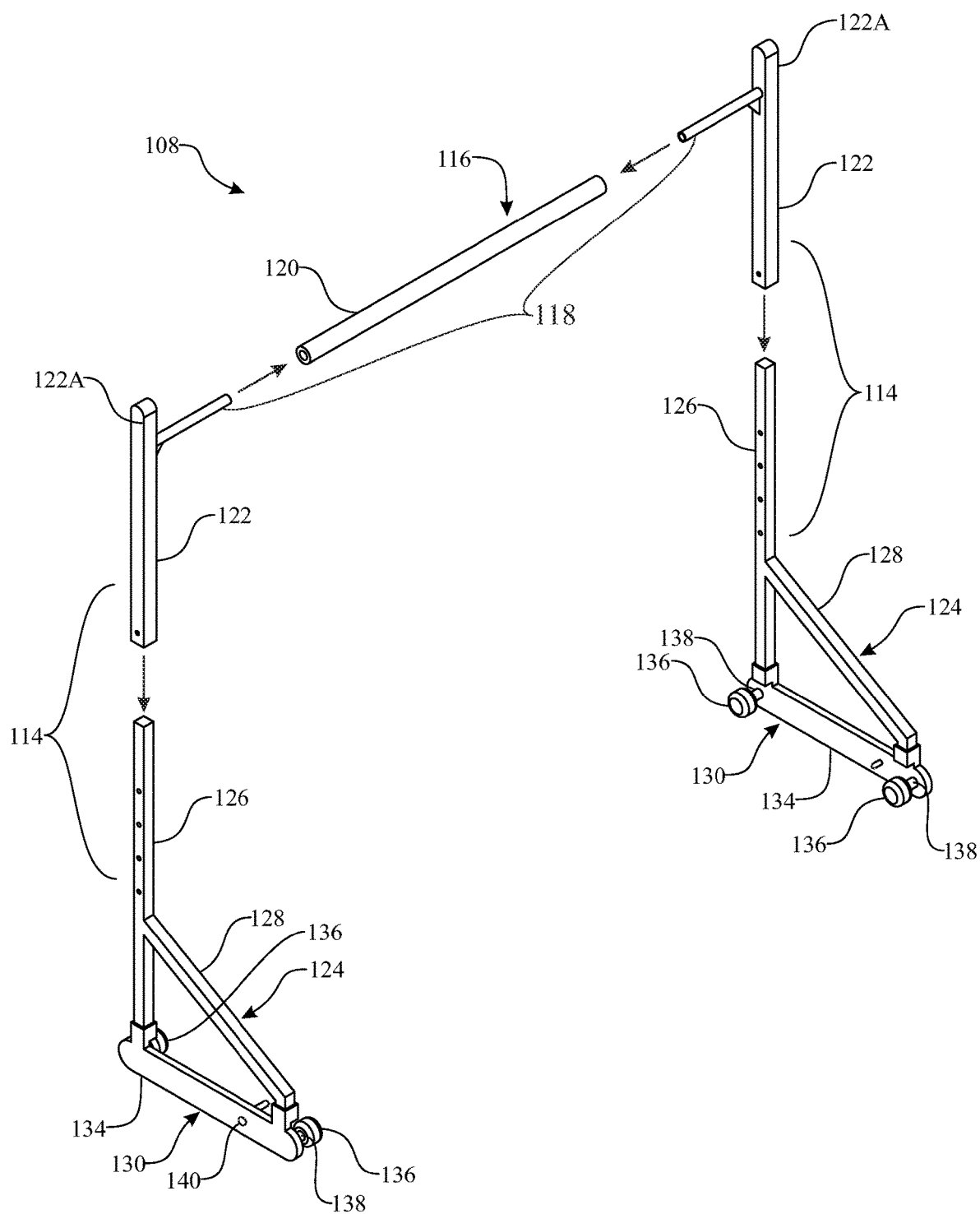
FIG. 3 presents a front isometric exploded view of the tarp guide device of the tarp distributing apparatus of FIG. 2.
Figure 4:
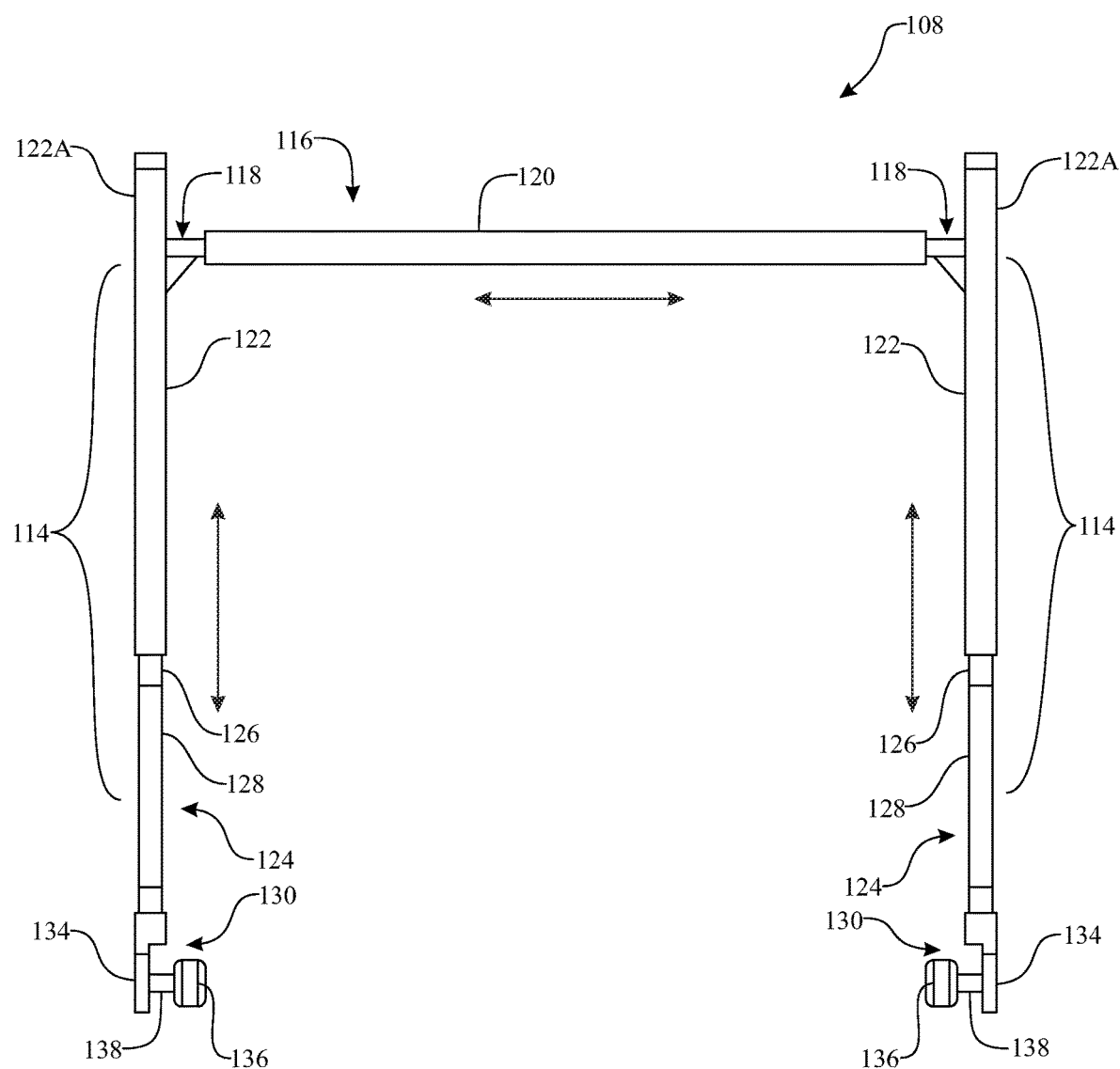
FIG. 4 presents a front assembled elevation view of the tarp guide device of the tarp distributing apparatus of FIG. 2.
Figure 5:
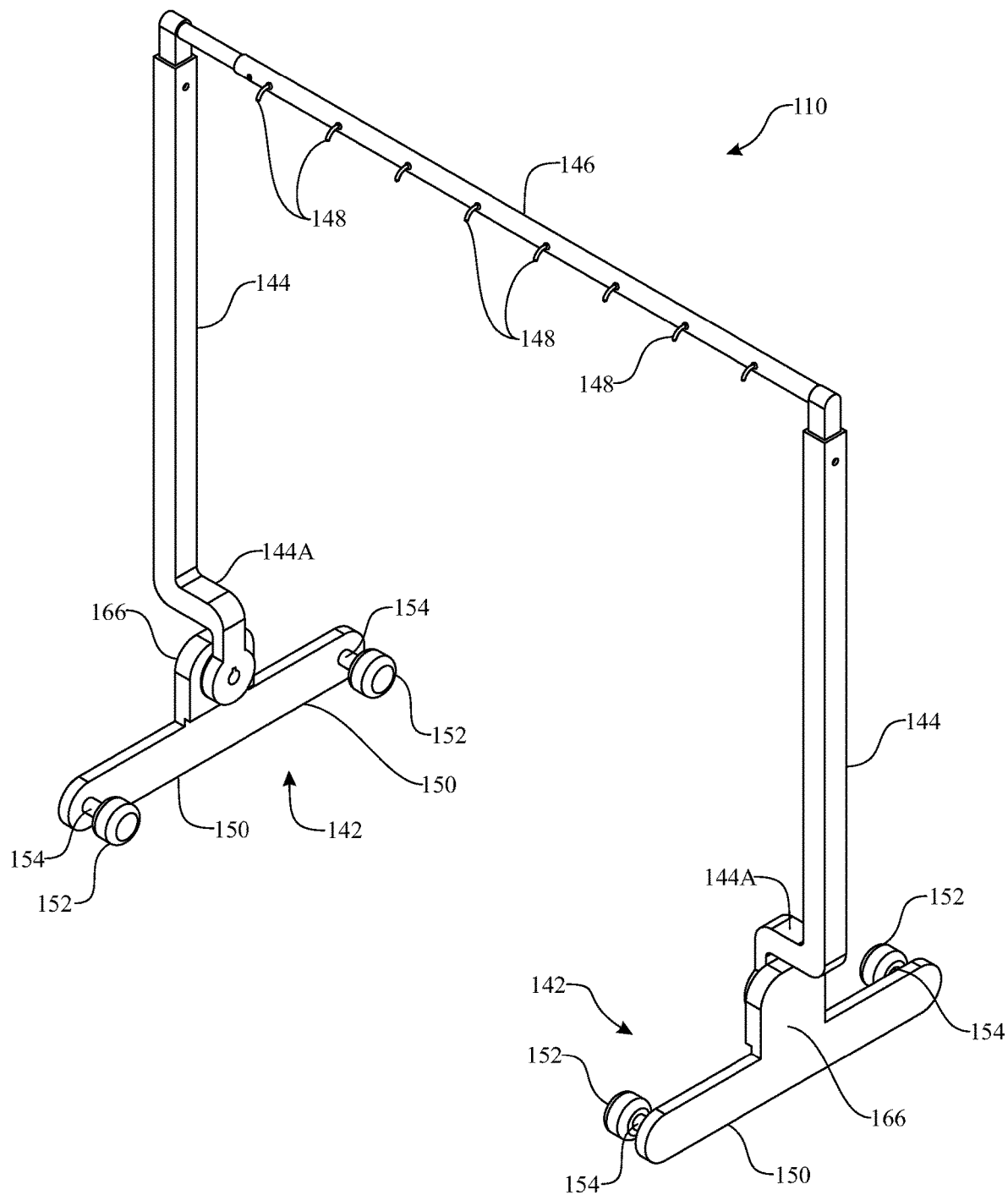
FIG. 5 presents a front isometric assembled view of a tarp draught device of the tarp distributing apparatus originally introduced in FIG. 1, the tarp draught device being mounted mobile and upright relative to the truck load bed and being actuatable so as to pull the tarp over the cargo.
Figure 6:
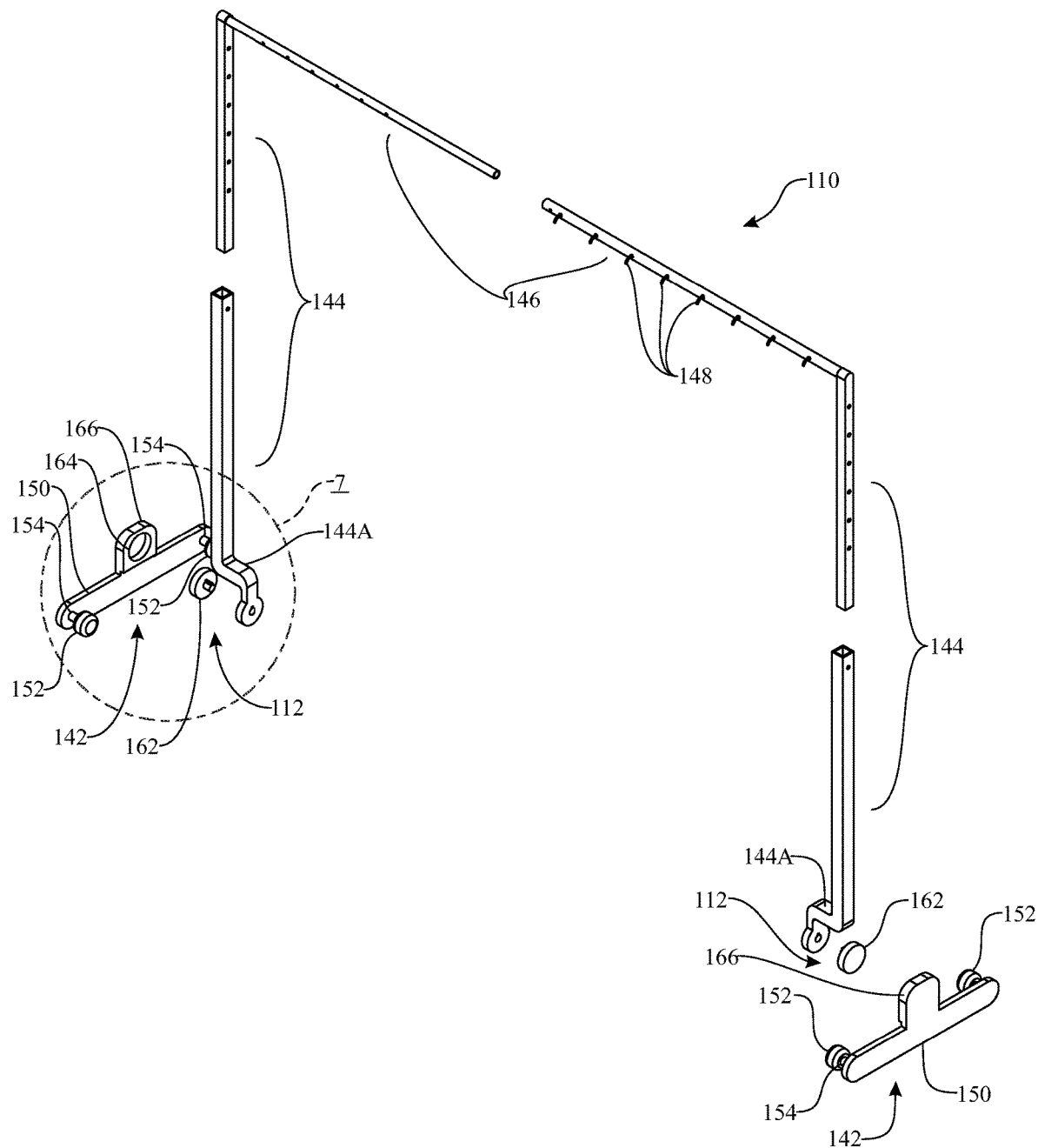
FIG. 6 presents a front isometric exploded view of the tarp draught device of the tarp distributing apparatus of FIG. 5.
Figure 7:
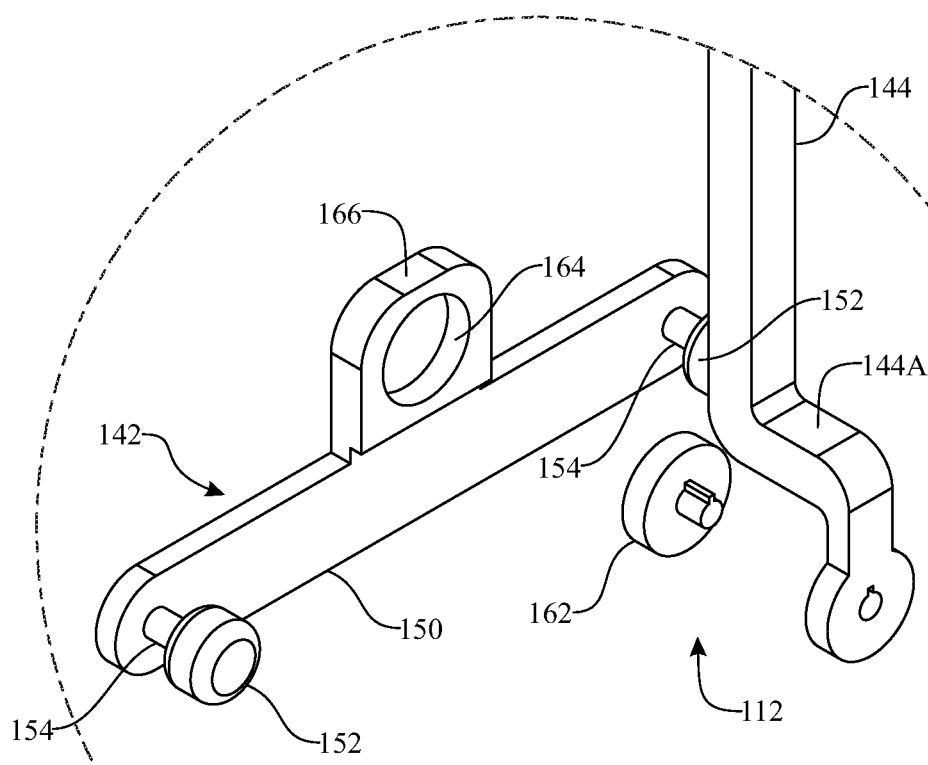
FIG. 7 presents an enlarged isometric detailed view of a lower portion of the tarp draught device that is enclosed in the dashed circle 7 of FIG. 6.
Figure 8:
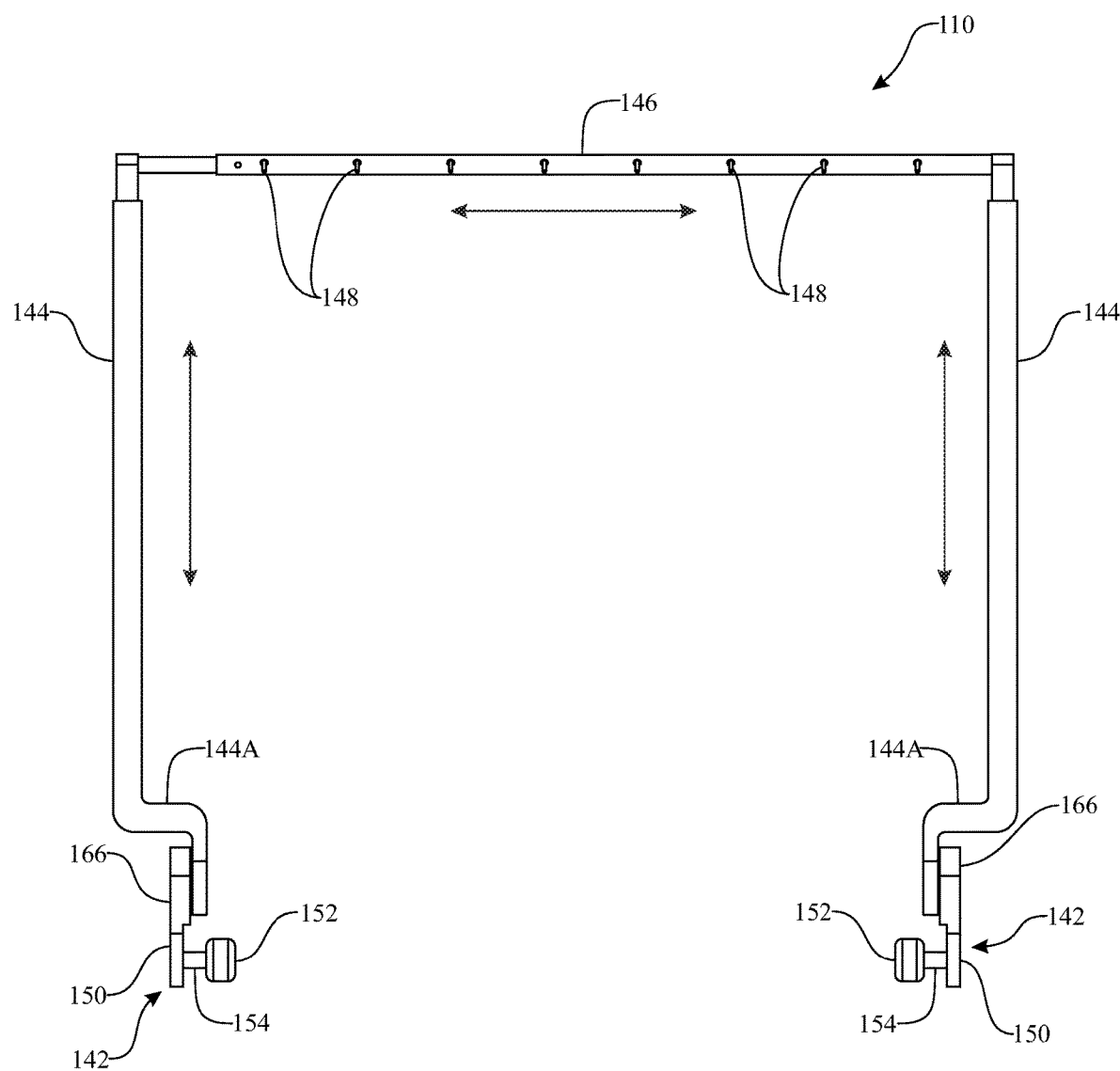
FIG. 8 presents a front assembled elevation view of the tarp draught device of the tarp distributing apparatus of FIG. 5.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-10, there is illustrated an exemplary embodiment of an apparatus, generally designated 100, for distributing a tarp 102, as seen in FIGS. 11-14, at least partially over a load of cargo 104, being shown in dashed outline form, on a mobile truck load bed 106. The tarp distributing apparatus 100 basically includes a tarp guide device 108, a tarp draught device 110, and an actuation mechanism 112. The tarp guide device 108 is disposed immobile relative to the truck load bed 106. The tarp draught device 110 is disposed mobile relative to the truck load bed 106 and actuatable to pull the tarp 102 over the tarp guide device 108 and the cargo 104. The actuation mechanism 112 is configured to manipulate and move the tarp draught device 110 relative to the tarp guide device 108 and the cargo 104 so as to accomplish distributing the tarp 102 at least partially over the cargo 104.

Referring now to FIGS. 1 and 11-14, the tarp guide device 108 is mounted in the immobile condition adjacent to and extending upright to above a rear location on the truck load bed 106 so as to establish the height to which the tarp 102 can be moved relative to the rear location on the truck load bed 106 to above and over the rear of the cargo 104 on the truck load bed 106. As additionally seen in FIGS. 2-4 and 10, the tarp guide device 108 includes a pair of upright support assemblies 114 and an upper cross assembly 116 extending between and interconnecting upper ends of the upright support assemblies 114. The upper cross assembly 116 establishes the height to which the tarp 102 can be moved relative to the rear location on the truck load bed 106 to above and over the rear of the cargo 104.

More particularly, the upper cross assembly 116 of the tarp guide device 108 includes an inner bar 118 and an outer roller 120 extending over and rotatable about the inner bar 118. The inner bar 118 extends between and is fixedly connected at opposite ends to the upper ends of the upright support assemblies 114 of the tarp guide device 108. The outer roller 120 may rotate about the inner bar 118 as the outer roller 120 guides the tarp 102 to above and over the rear of the cargo 104.

Each of the upright support assemblies 114 of the tarp guide device 108 includes an upper tubular member 122 and a lower tubular structure 124. The upper tubular members 122 of the upright support assemblies 114 have respective upper end portions 122A being fixedly connected to and extending above the respective opposite ends of the inner bar 118 of the upper cross assembly 116. The upper end portions 122A of the upper tubular members 122 of the upright support assemblies 114 of the tarp guide device 108 that extend above the upper cross assembly 116 of the tarp guide device 108 thus prevent the tarp 102, as it is being pulled and moved by the tarp draught device 110 over the upper cross assembly 116, from falling off the tarp guide device 108 and the cargo 104. The lower tubular structures 124 of the upright support assemblies 114 support the respective upper tubular members 122 by means of lower tubular members 126, which are aligned and telescopably interfitted with the respective upper tubular members 122, and by means of braces 128 extending angularly between and connected with the respective lower tubular members 126 and the respective carriages 130 of the upright support assemblies 114.

Still more particularly, each of the carriages 130 is mounted to one of a pair of tracks or channels 132 defined along opposite side edges of the truck load bed 106. Each of the lower tubular structures 124 is fixedly mounted at a lower end to one of the carriages 130. Each of the carriages 130 of the tarp guide device 108 includes an elongated main member 134 and a pair of wheels 136 each mounted on a corresponding one of a pair of axles 138 attached to one of a pair of opposite ends of the main member 134 and extending laterally therefrom, Each of the wheels 136 is disposed in the one channel 132 along the respective opposite side edges of the truck load bed 106. The immobility of the mounting of the tarp guide device 108 relative to the truck load bed 106 may be brought about by the installation of a pin 140 interconnecting the main member 134 of each of the carriages 130 with the respective side edges of the truck load bed 106.

Referring again to FIGS. 1, 11 and 12, the tarp draught device 110 is disposed adjacent to and extends upright to above the truck load bed 106 forwardly of the tarp guide device 108. As additionally seen in FIGS. 5-10, the tarp draught device 110 includes a pair of carriages 142, a pair of elongated posts 144 each pivotally mounted at a lower end to one of the carriages 142, and an upper cross bar 146 extending between and interconnecting upper ends of the elongated posts 144. The elongated posts 144 and the upper cross bar 146 may each be constructed of telescoping parts, as seen in FIGS. 6 and 8-10. The upper cross bar 146 has a plurality of elements 148, such hooks, being attached thereon and spaced apart from one another. The elements 148 are configured to engage with a leading end of the tarp 102 for pulling the tarp relative to the tarp guide device 108 and forwardly over the rear end of the cargo 104. The tarp draught device 110 is initially immobilized adjacent to the tarp guide device 108 at the start in order for its elongated posts 144 and upper cross bar 146 to undergo movement relative to its carriages 142 and the tarp guide device 108 for the elements 148 to engage the tarp 102 and pull it over to the tarp guide device 108, between the upper end portions 122A of upright support assemblies 114 thereof, and forwardly over the rear end of the cargo 104. Then, the tarp draught device 110 is mobilized so that it can undergo movement along the truck load bed 106 away from the tarp guide device 108 to continue pulling the tarp 102 over the cargo 104 toward the front end thereof.

More particularly, each of the carriages 142 includes an elongated main member 150 and a pair of wheels 152 each mounted on a corresponding one of a pair of axles 154 attached to one of a pair of opposite ends of the main member 150 and extending laterally therefrom. Each of the wheels 152 is disposed in the one channel 132 along each of the opposite side edges of the truck load bed 106. The initial immobility of the mounting of the tarp draught device 110 relative to the truck load bed 106 may be brought about by the installation of a pin 154 so as to interconnect the main member 150 of each of the carriages 142 with the respective side edges of the truck load bed 106. By removing the pin 155 the tarp draught device 110 becomes mobile relative to the truck load bed 106.

Figure 9:
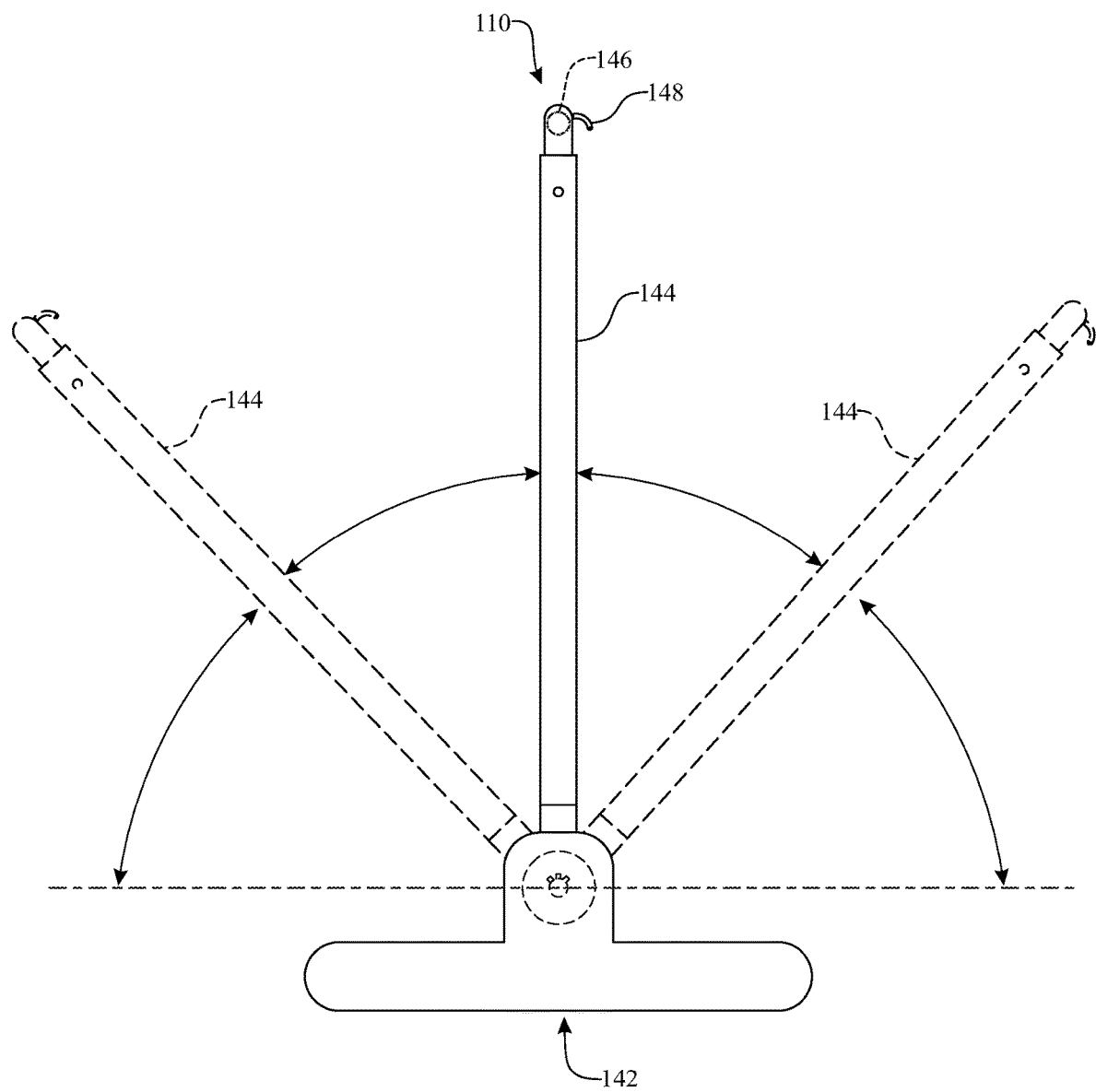
FIG. 9 presents a side elevation view of the tarp draught device of the tarp distributing apparatus of FIG. 5, showing the range of pivotal movement that a pair of elongated posts, together with an upper cross bar extending between and interconnecting upper ends of the elongated posts of the tarp draught device, can undergo relative to lower carriages of the tarp draught device.
Figure 10:
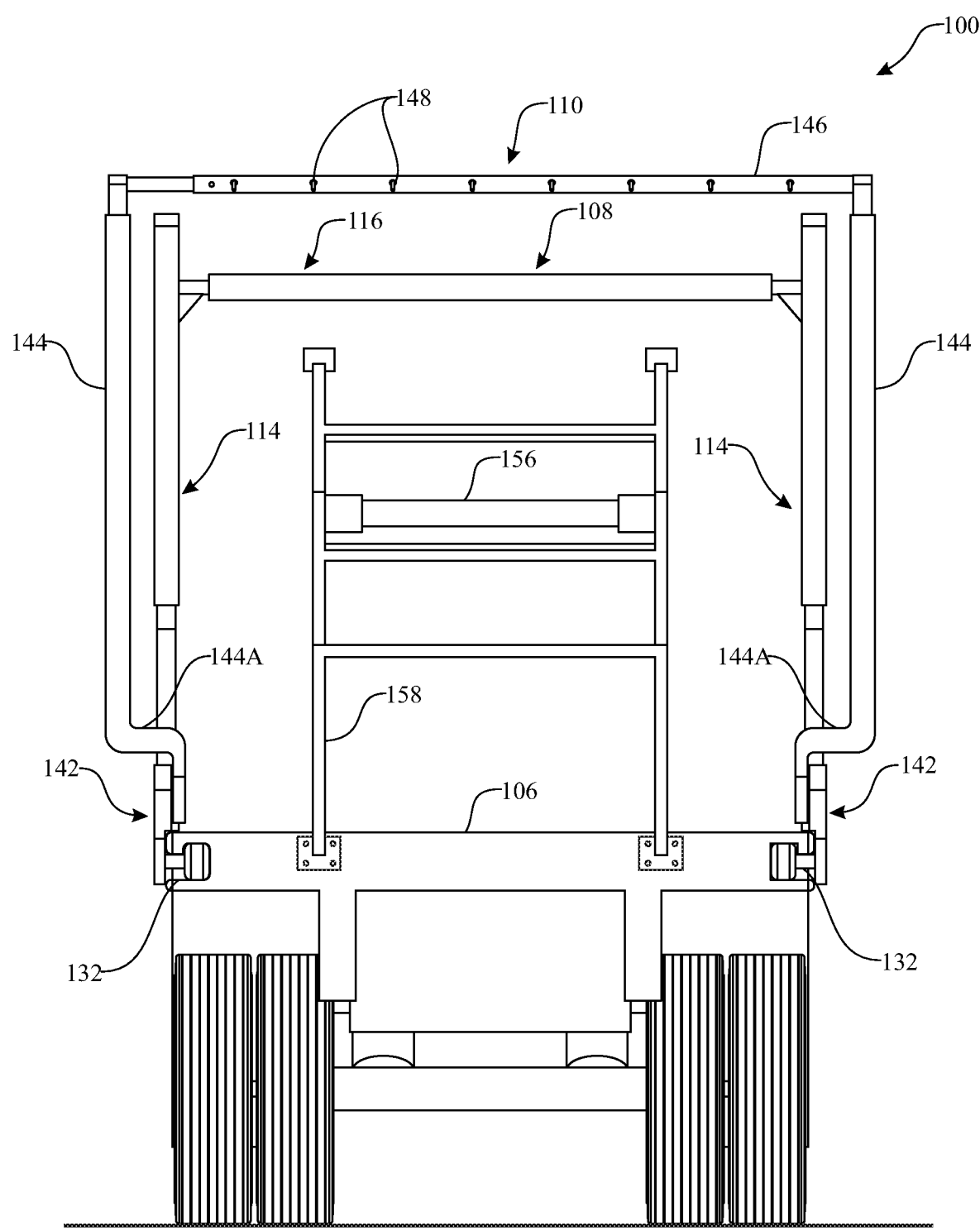
FIG. 10 presents a front elevation view of the tarp distributing apparatus originally introduced in FIG. 1.
Figure 11:
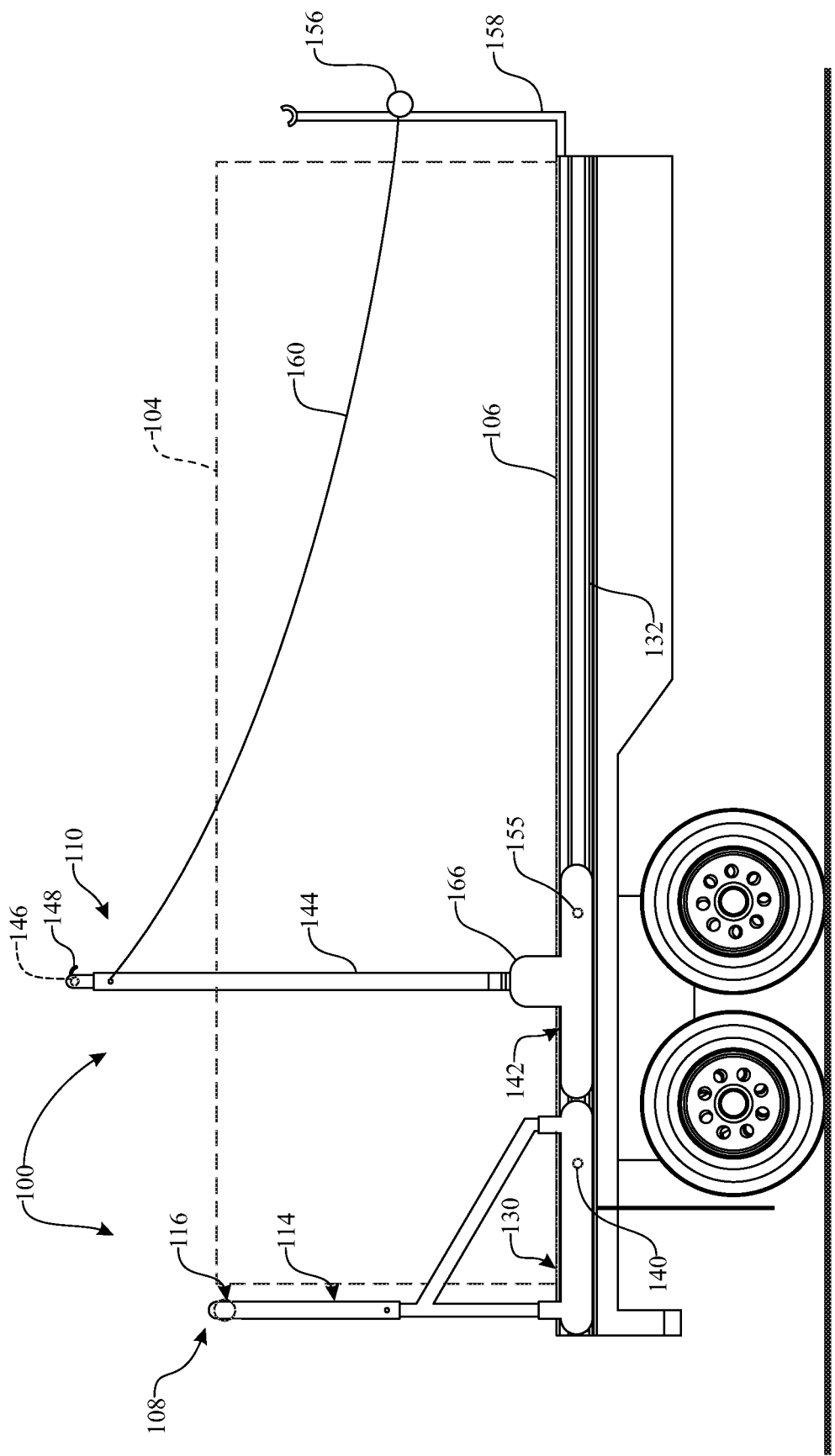
FIGS. 11-14 present multiple side elevation views of the tarp distributing apparatus in a sequence of positions during the carrying out of distributing a tarp at least partially over a load of cargo on the truck bed.
Figure 12:
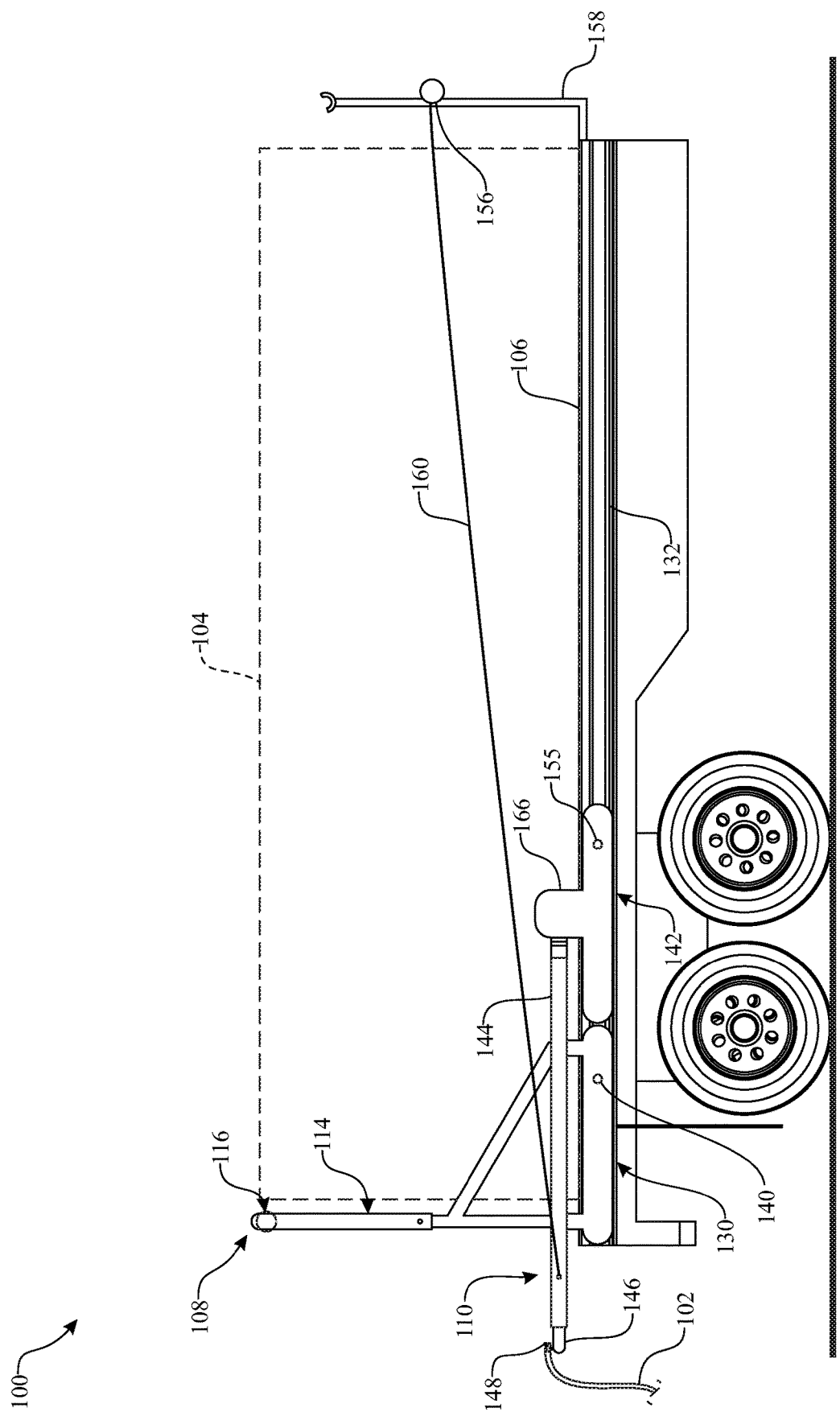

Referring to FIGS. 1 and 10-14, the actuation mechanism 112 is configured to manipulate and move the tarp draught device 110 relative to the tarp guide device 108 and the cargo 104 so as to accomplish distributing the tarp 102 at least partially over the cargo 104. More particularly, by way of example but not limitation, the actuation mechanism 112 may be a winch 156 mounted by a bracket 158 adjacent to a front end of the truck load bed 106 and at least one cable 160 that extends between and interconnects the winch 156 with the tarp draught device 110. Alternatively, the actuation mechanism 112 may be a pair of actuators 162, such as key lock rotary motors, each being mounted within one of a pair of facing recesses 164 defined within respective housings 166 attached upon the elongated main members 150 of the carriages 142 of the tarp draught device 110 midway between the opposite ends of the main members 150. The actuators 162 pivotally and drivingly couple the lower ends of the respective elongated posts 144 of the tarp draught device 110 to the main members 150 of the carriages 142. The actuators 162 may drive the elongated posts 144 of the tarp draught device 110, or the winch 156 and cable 160 may be used to make the tarp draught device 110, to undergo movement between the upright position and the angularly displaced positions toward and away from the tarp guide device 108 and the upright position, as depicted in FIG. 9. The elongated posts 144 may be spring-loaded to normally assume the upright positions. Initially, with the pin 155 installed in the tarp draught device 110, the elongated posts 144 of the tarp draught device 110 may be manually pivoted from the upright position to forwardly angularly displaced position as seen in FIG. 12. A 12V DC battery (not shown) or the like that is in the truck to provide the electrical power requirements for operation of the truck may also be the source of electrical power to operate the winch 156 or the actuators 162.

Furthermore, as seen in FIGS. 1, 5-8 and 10, the posts 144 at their lower ends have offsetting portions 144A extending away from one another so as to provide sufficient space between the posts 144 and below the upper cross bar 146 to allow the tarp draught device 110 to respectively pass by outside of and over the upright support assemblies 114 and upper cross assembly 116 of the tarp guide device 108.

Figure 13:
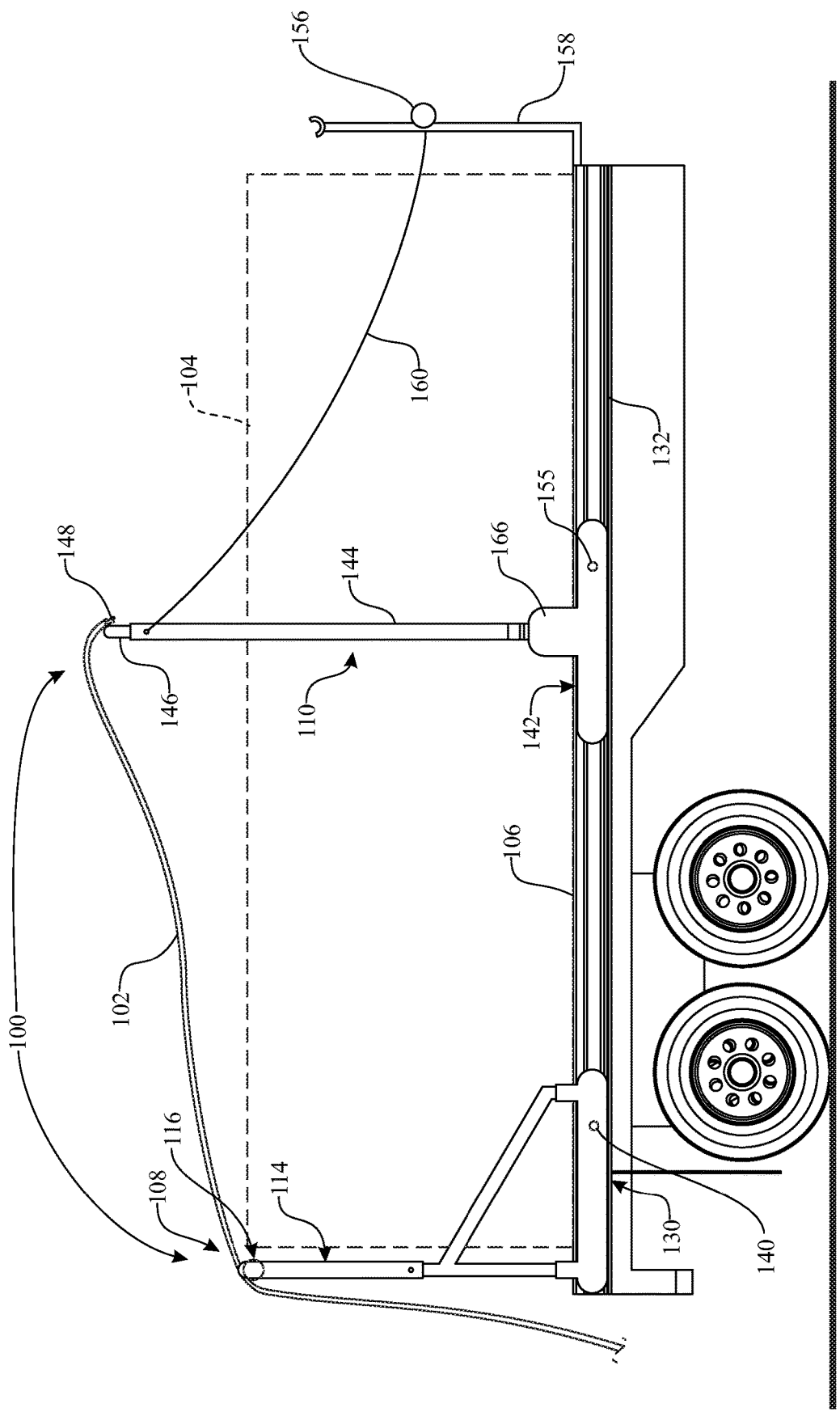
Figure 14:
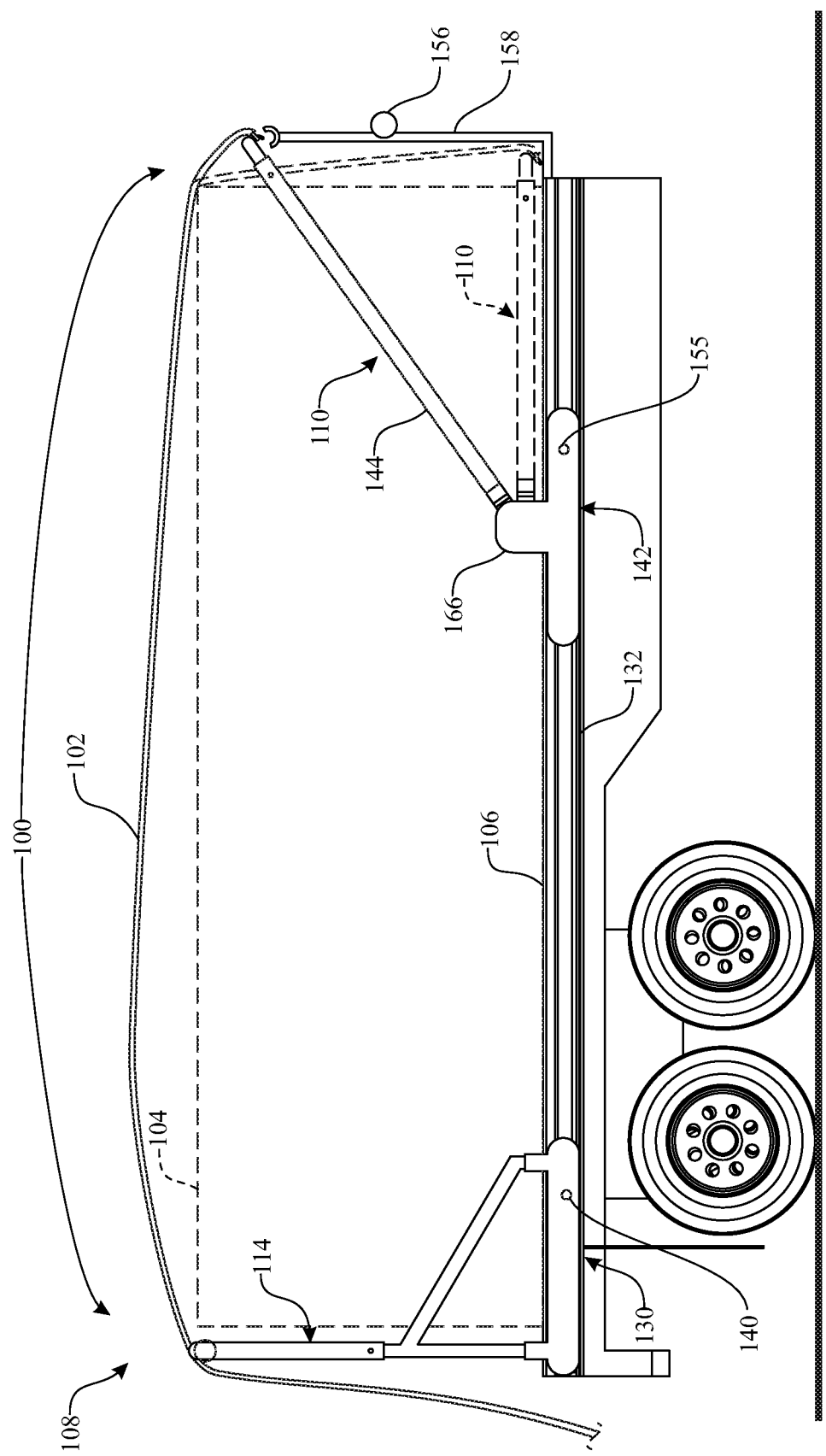
Figure 15:
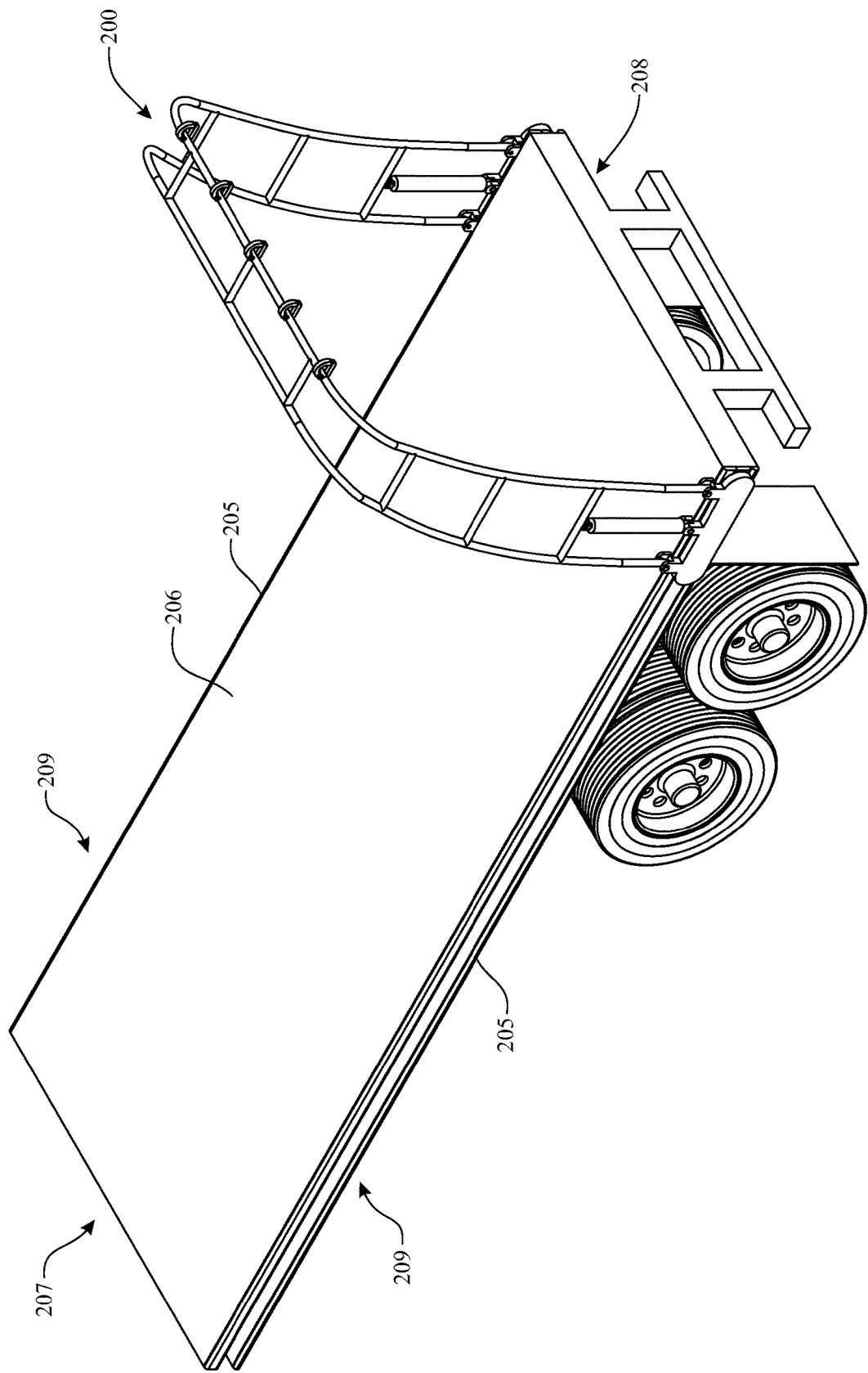
FIG. 15 presents a side, upper elevation, isometric view of the loading bed of a transport vehicle, illustrating the manner of installation of a mobile assembly for drawing a tarp over cargo (not shown) loaded onto the bed, according to aspects of another embodiment of the present invention.

Referring now to FIGS. 11-14, there can be seen the basic steps of the method of operation of the tarp distributing apparatus 100. FIG. 11 shows positioning the upper cross assembly 116 of the tarp guide device 108 adjacent to and above the rear location on the truck load bed 106 so as to establish the height to which the tarp 102 can be moved over the outer roller 120 of the upper cross assembly 116 to above and over the rear of the cargo 104 on the truck load bed 106. Also, FIG. 11 shows positioning the upper cross bar 146 of the tarp draught device 110 forwardly of the upper cross assembly 116 of the tarp guide device 108 and above the cargo 102 on the truck load bed 106. FIG. 12 shows moving of the tarp draught device 100 relative to the upper cross assembly 116 of the tarp guide device 108 to position the upper cross bar 146 of the tarp draught device 110 along and to the rear of the cargo 104 on the truck load bed 106, followed by engaging the tarp 102 with the upper cross bar 146 of the tarp draught device 110. FIG. 13 shows moving the tarp draught device 110 and the upper cross bar 146 therewith forwardly along the truck load bed 106 and away from the upper cross assembly 116 of the tarp guide device 108 in order to pull the tarp 102 forwardly over the cargo 104 so as to accomplish distributing the tarp 102 at least partially over the cargo 104. FIG. 14 shows two alternative final positions for the tarp draught devices 110 at the end of the method of operation.

It should be understood that while only one tarp 102 is shown in use in the drawings, the operation of the apparatus 100 may be repeated to distribute more than one tarp 102 over the cargo 104. Also, after the tarp(s) 102 are distributed over the cargo 104, they are tied down to the truck load bed 106 by the driver.

Referring now to FIGS. 15-24, there is shown a mobile tarp retrieval, towing, and distribution apparatus, generally illustrated at 200, for distributing a tarp or other such covering 202 over cargo or freight 204 loaded onto the bed or deck 206 of a transport vehicle such as a truck, according to another embodiment of the present invention. FIGS. 15-20 illustrate the configuration, assembly, and installation of mobile apparatus 200, while FIGS. 21-24 illustrate the deployment and operation of apparatus 200. The trailer bed 206 has a conventional form, including a front end 207, a rear end 208, and a pair of opposing sides 209 extending between the front end 207 and rear end 208. In a conventional way, the trailer bed 206 can be provided as part of a flat bed semi-trailer, which is towed or hauled by a tractor unit such as a truck (not shown), making a conventional tractor-trailer combination. For purposes herein, covering 202 should be construed as including, without limitation, any type of means intended to cover, in whole or in part, a freight 204, such as a tarp, netting, screen, canvas, mesh, or flexible material (with any amount of permeability).

Referring more particularly to FIGS. 15-20, the illustrated mobile apparatus 200 includes, in combination, a tarp attachment and towing structure 210, a pair of carriage devices 212, and a pair of linear actuators 214. Briefly, and discussed more fully below, structure 210 is mounted to the pair of carriage devices 212 so that structure 210 can pivot relative to the pair of carriage devices 212, in both a forward and rearward direction. The pair of carriage devices 212 are adapted for travel along the trailer bed 206, allowing a tarp 202 attached to structure 210 to be towed along behind the moving structure 210 and thereby distributed over cargo 204 loaded onto trailer bed 206. The pair of linear actuators 214 facilitates the pivoting movement of structure 210 by exerting a driving influence on structure 210 in such a manner as to induce a turning moment that pivots structure 210.

In one exemplary form, the structure 210 includes a pair of generally parallel, opposing, spaced-apart side members 220, 222. The structure 210 further includes a plurality of spaced-apart transverse members 224 that extend cross-wise between, and attach to, the pair of side members 220, 222. In its assembled form, and deployed on trailer bed 206, the apparatus 200 is arranged so that side member 220 is in a fore or forward position (more proximal to the front end 207) of truck bed 206, and side member 222 is in an aft or rearward position (more proximal to the rear end 208) of trailer bed 206. The pair of side members 220, 222 can be constructed in any suitable manner, such as a single-body tubular structure or a series of interconnecting tubes, links or bars. Likewise, the transverse members 224 can be provided in any suitable form, such as tubes or rails.

As discussed further, structure 210 defines the point of attachment to covering 202. For this purpose, structure 210 includes a plurality of fasteners 230 that are spaced-apart along the aft side member 222. These fasteners 230 provide a releasable connection to the leading edge of covering 202 during the tarp spreading or distribution process. In one exemplary configuration, the fasteners 230 can be provided in the form of quick-release clips, such as D-shaped mechanisms, which are each fastened to the covering 202 by means of clipping into grommets or eyelets provided along the leading edge of covering 202. Any conventional means can be used to secure structure 210 to covering 202. An appropriate number and arrangement of fasteners 230 is provided to ensure attachment to a proper amount of covering 202 commensurate with adequate covering of cargo 204.

Figure 18:
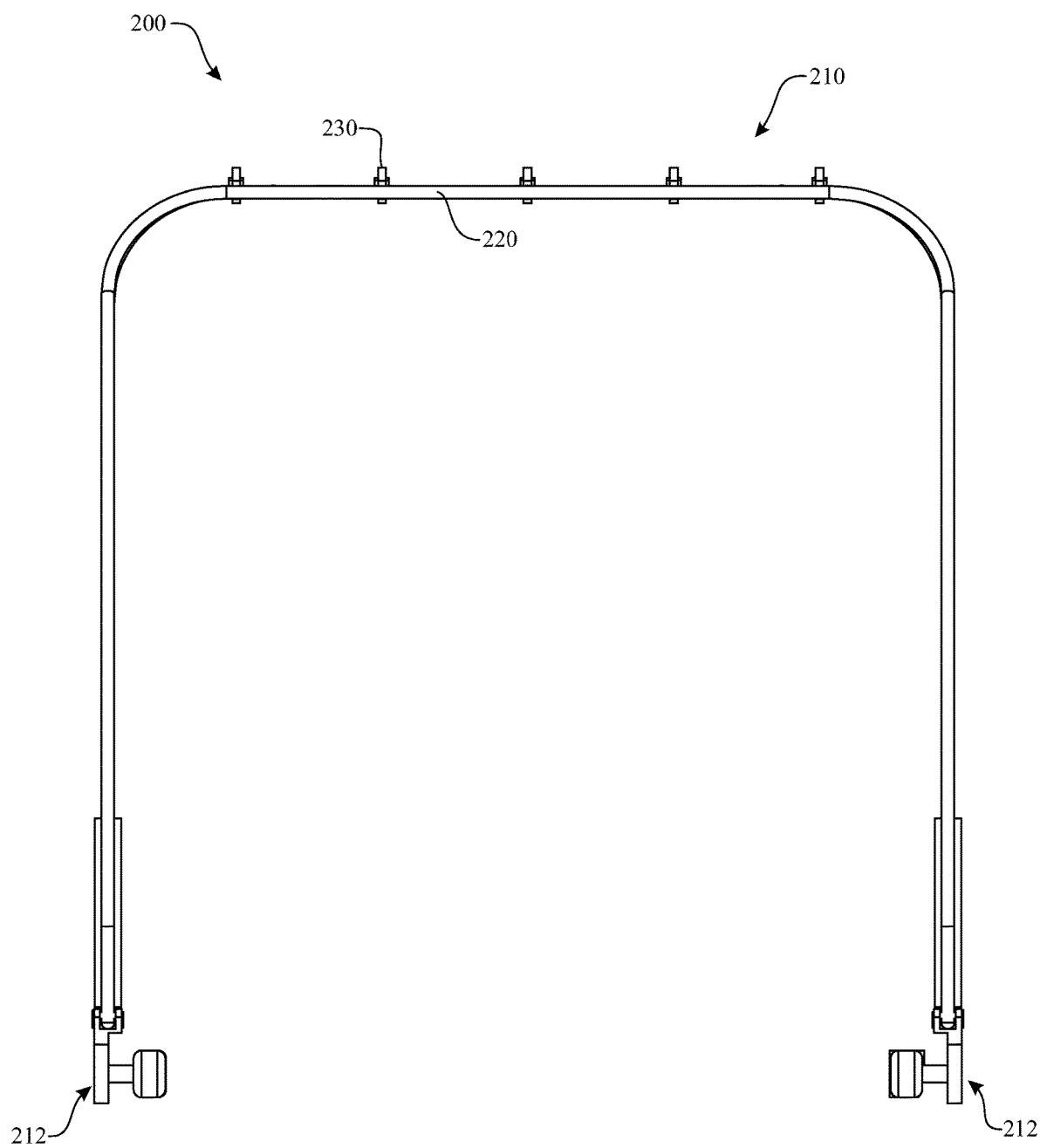
FIG. 18 presents a front assembled elevation view of the mobile assembly originally introduced in FIG. 15.

Structure 210 defines a clearance space relative to cargo 204 on trailer bed 206. In particular, as discussed further, structure 210 spans the width of trailer bed 206 in its installed configuration (FIG. 15), and, during operation, travels the length of trailer bed 206 from its rear end 208 to its front end 207, drawing the attached covering 202 over cargo 204 loaded onto bed 206 (FIGS. 21-24). Accordingly, structure 210 has a configuration suitable for this purpose, presenting a profile that can pass over cargo 204 without impediment. In one exemplary form, structure 210 has an arch-like profile including a pair of ends or leg portions 240 and a middle or cross-over section 242 extending between the ends 240. The arch-like span of structure 210 will have a clearance that is sufficient to enable structure 210 to pass over cargo 204, i.e., structure 210 will define a clearance space having dimensions that can accommodate passage over cargo 204. The arch-like profile of structure 210, and its accompanying clearance, are best depicted in FIGS. 18 (assembled form) and 20 (installed condition). In this form, structure 210 can be constituted as a movable arched framework. Structure 210 can also be considered to possess a ladder-like configuration or framework, in which the pair of side members 220, 220 defines a frame and the transverse members 224 define rung-like elements. In this form, structure 210 can be shaped as a bent or curved ladder-like framework having an arched-style profile.

The illustrated pair of carriage devices 212 constitute components that structure 210 is mounted onto at respective ends 240. As discussed further, this assembled combination of structure 210 with the pair of carriage devices 212 enables structure 210 to controllably travel along the longitudinal dimension of trailer bed 206, which extends between its front end 207 and rear end 208. Each one of the carriage devices 212 includes an elongated main section 250 and a pair of inward, spaced-apart wheels 252 each mounted on a corresponding one of a pair of axles or hubs 254 disposed at opposite ends of main section 250. The pair of axles 254 extend laterally inward from an inner face of main section 250. The pair of wheels 252 are rotatably mounted to the pair of axles 254. For purposes of accommodating and facilitating the travel of the pair of carriage devices 212, the trailer bed 206 is adapted to include a pair of rails or tracks, generally illustrated at 205 (FIG. 15), that are each located at a respective one of the opposing sides 209 of trailer bed 206. The rails 205 preferably extend the full length of the longitudinal dimension of trailer bed 206. Each one of the rails 205 defines a suitable channel or guideway in which the pair of wheels 252 of an associated carriage device 212 are disposed. As installed, the pair of carriage devices 212 are able to translate in tandem along the respective pair of tracks 205 in a rolling motion facilitated by the respective pair of wheels 252.

The structure 210 is pivotally mounted at its pair of ends or leg portions 240 to respective ones of the pair of carriage devices 212. For this purpose, each carriage device 212 includes a pair of pivot joints 260, 262 disposed at opposite ends of main section 250 at an upper side thereof. As discussed further, the leading pivot joint 260 is in a forward or fore position to enable structure 210 to pivot forward (a fore direction), while the trailing pivot joint 262 is in a rearward or aft position to enable structure 210 to pivot rearward (an aft direction). Each one of the pivot joints 260, 262 is configured with a pair of opposing, spaced-apart, upright flanges 264 and a selectively removable pin or shaft 266 extending between the pair of flanges 264 and defining a pivot axis. Any other conventional means can be used to construct the pivot joints 260, 262.

In order to facilitate its pivotal mounting to the pair of carriage devices 212, structure 210 is adapted at its pair of ends 240 so that front side member 220 terminates in a foot portion 244 having a slot 245 formed therethrough, and rear side member 222 terminates in a foot portion 246 having a slot 247 formed therethrough. During assembly, structure 210 is mounted to the pair of carriage devices 212 so that front side member 220 is pivotally connected via foot portions 244 (at both ends 240 of structure 210) to a corresponding forward pivot joint 260, while rear side member 222 is pivotally connected via foot portions 246 (at both ends 240 of structure 210) to a corresponding rearward pivot joint 262. In particular, at each forward pivot joint 260 of the pair of carriage devices 212, the respective pin 266 is received through the corresponding slot 245 of the foot portion 244 of front side member 220, thereby rotatably supporting front side member 220. Likewise, at each rearward pivot joint 262 of the pair of carriage devices 212, the respective pin 266 is received through the corresponding slot 247 of the foot portion 246 of rear side member 222, thereby rotatably supporting rear side member 222.

Figure 19:
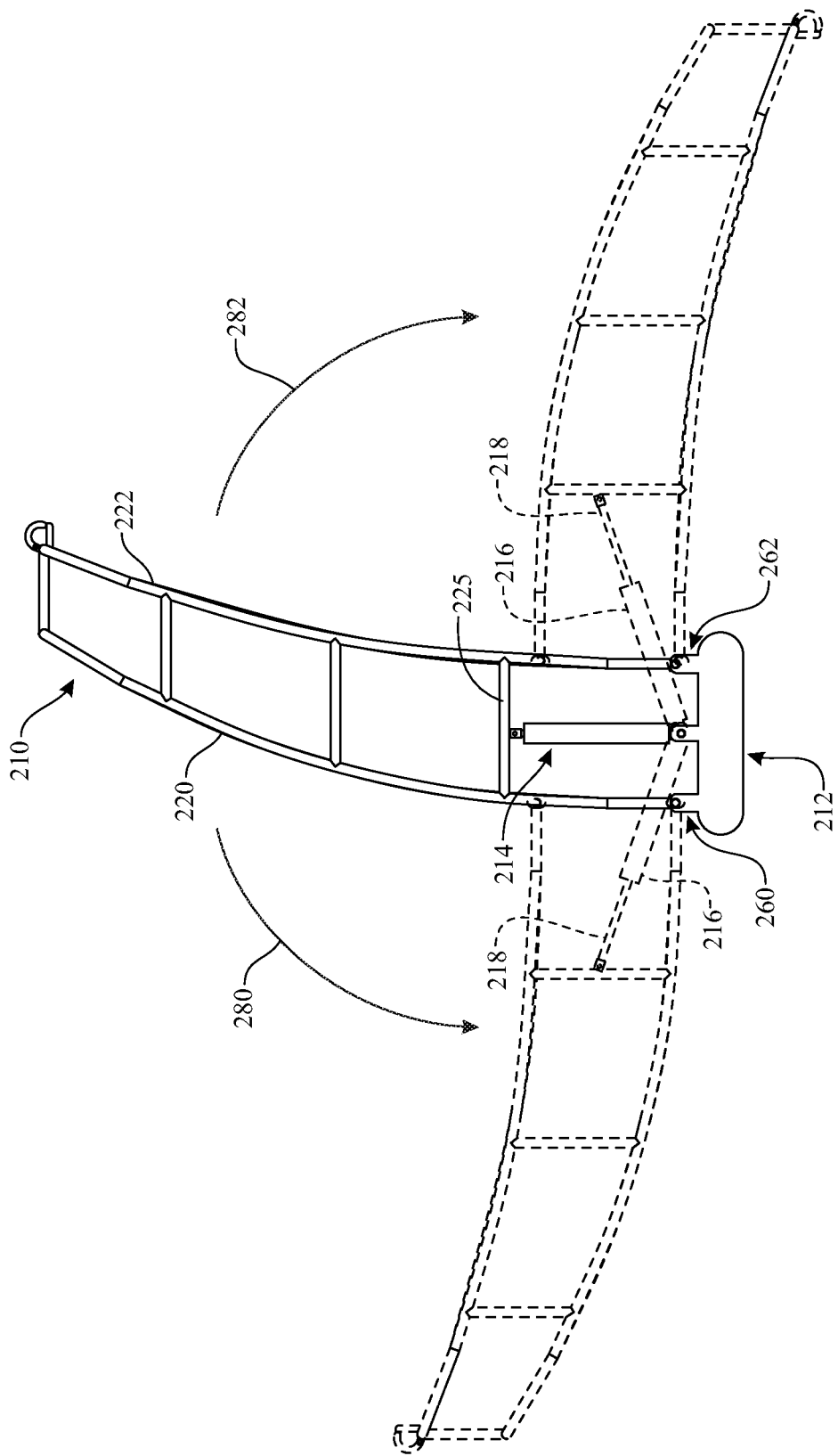
FIG. 19 is a side elevation view of the mobile assembly originally introduced in FIG. 15, illustrating the range of motion in both the fore and aft directions (shown in phantom) relative to the upright position as depicted.
Figure 20:
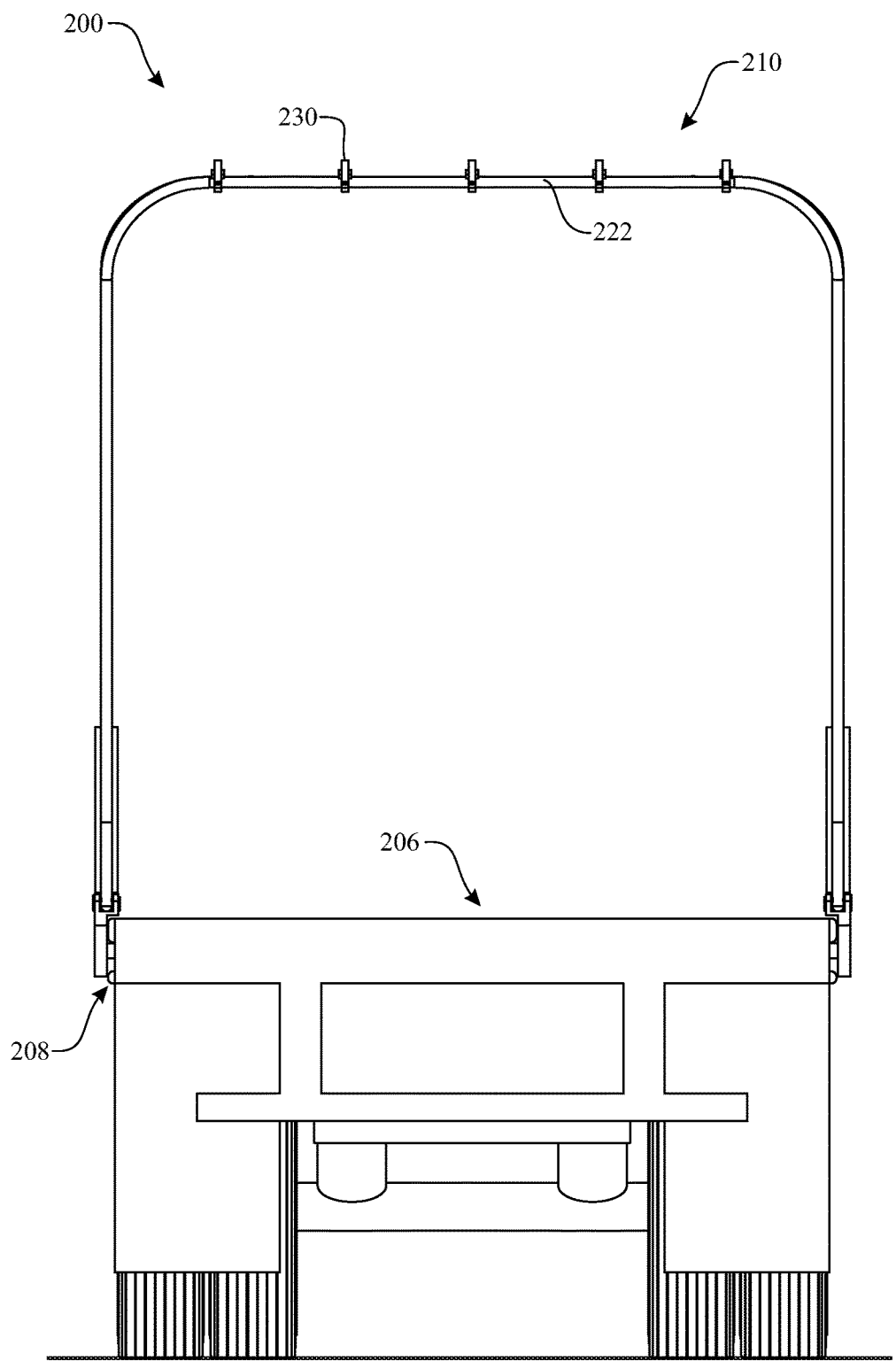
FIG. 20 presents a rear elevation view of the mobile assembly in its installed location spanning the bed of a transport vehicle, as first illustrated in FIG. 15.

The pair of forward pivot joints 260 of the pair of carriage devices 212 defines a first, front pivot axis of structure 210, which enables structure 210 to pivot (undergo angular displacement) in the forward direction (i.e., the exemplary counterclockwise motion 280 shown in phantom in FIG. 19). Additionally, the pair of rearward pivot joints 262 of the pair of carriage devices 212 defines a second, rear pivot axis of structure 210, which enables structure 210 to pivot (undergo angular displacement) in the rearward direction (i.e., the exemplary clockwise motion 282 shown in phantom in FIG. 19). Each one of the pivot joints 260, 262 of the pair of carriage devices 212 establishes a selectively attachable pivoting connection between the pair of carriage devices 212 and the pair of side members 220, 222, respectively, of structure 210. In particular, the pivoting connection can be temporarily released by removal of the relevant pin 266. For example, if an operator desires to pivot structure 210 in a forward direction, the respective pins 266 of the pair of rearward pivot joints 262 of the pair of carriage devices 212 are temporarily removed, effectively disengaging the rear side member 222 from its connectivity to the pair of carriage devices 212. In this manner, the rear side member 222 is now free to swing out as structure 210 pivots about the front pivot axis established by the pair of forward pivot joints 260 of the pair of carriage devices 212. Similarly, if an operator desires to pivot structure 210 in a rearward direction, the respective pins 266 of the pair of forward pivot joints 260 of the pair of carriage devices 212 are temporarily removed, effectively disengaging the front side member 220 from its connectivity to the pair of carriage devices 212. In this manner, the front side member 220 is now free to swing out as structure 210 pivots about the rear pivot axis established by the pair of rearward pivot joints 262 of the pair of carriage devices 212.

Figure 16:
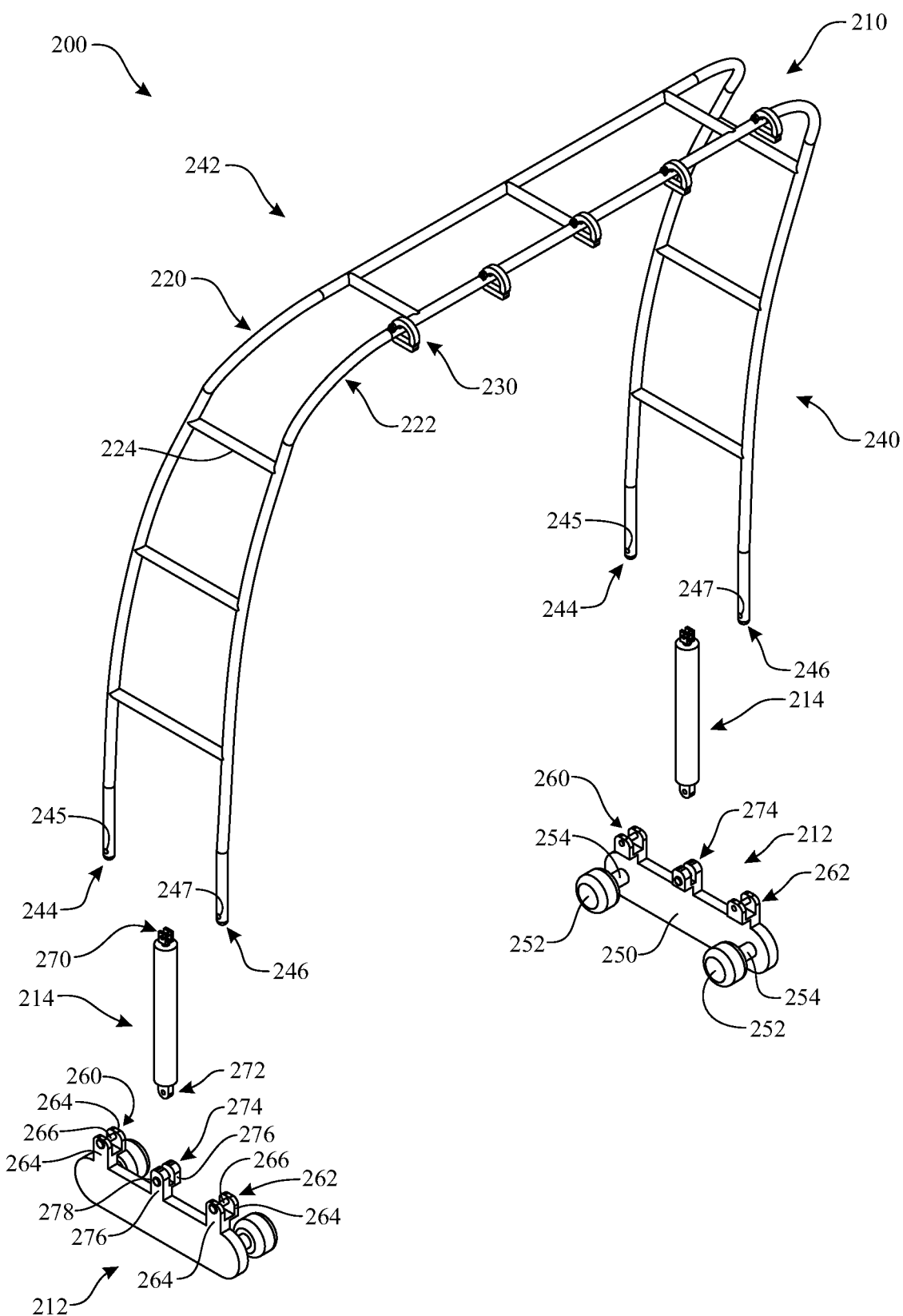
FIG. 16 presents an exploded, isometric view of the mobile assembly originally introduced in FIG. 15.
Figure 17:
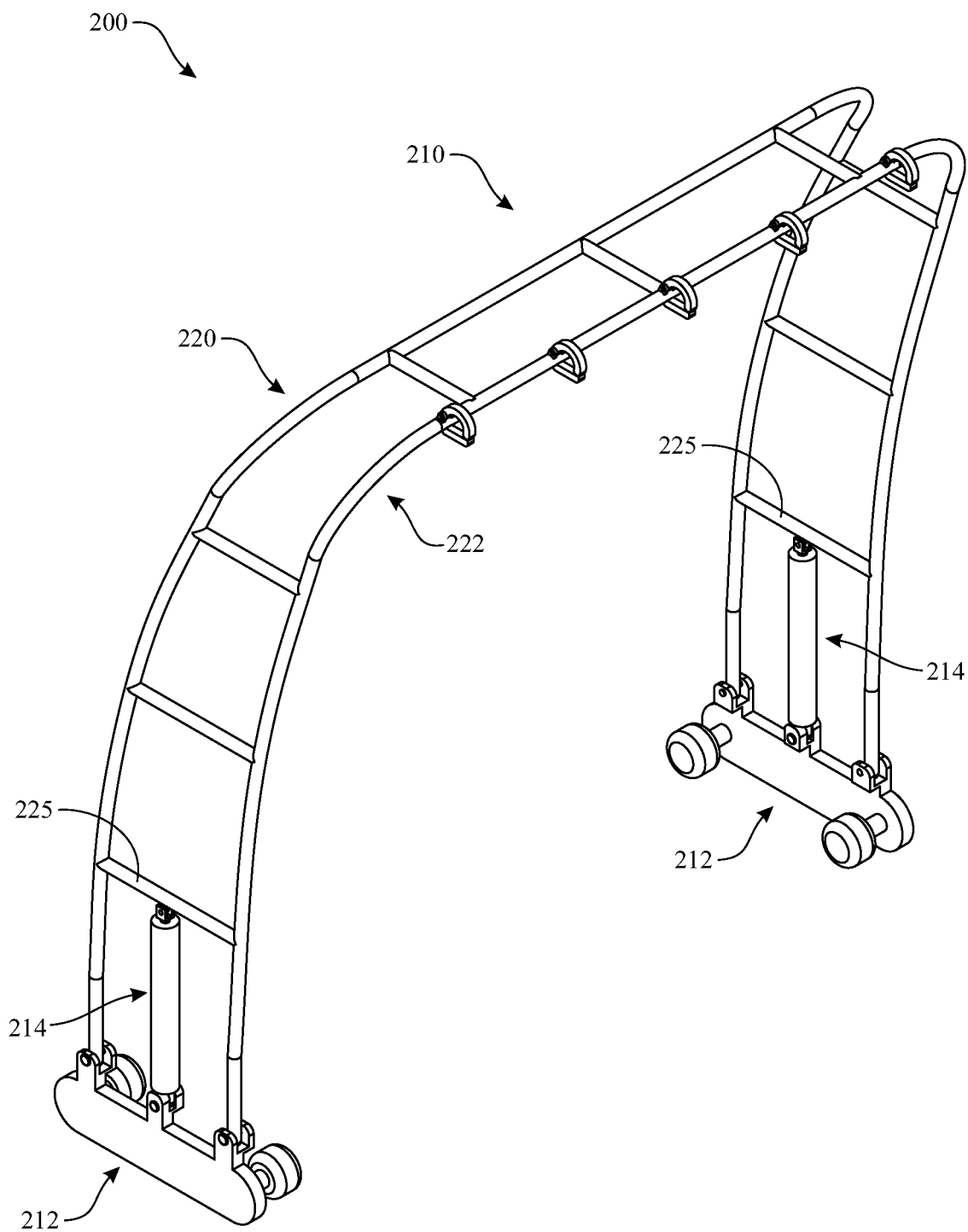
FIG. 17 presents an upper elevation, isometric view of the mobile assembly originally introduced in FIG. 15, showing the mobile assembly in its fully assembled condition.

Referring particularly to FIGS. 16-17 and 19, the illustrated pair of linear actuators 214 are employed in apparatus 200 to induce a pivoting movement or angular displacement of structure 210. Each one of the linear actuators 214 has a conventional form, such as a piston-cylinder combination in which a piston 218 housed in a cylinder 216 is capable of extending and retracting so as to impart a linear drive action to an attached object, i.e., structure 210 (FIG. 19). In such an exemplary form, each one of the linear actuators 214 includes a drive end 270 and a mounting end 272. The drive end 270 is drivingly coupled to one of the transverse members or rungs 224 of structure 210, using any attachment means known to those skilled in the art. In an exemplary form, each one of the linear actuators 214 is coupled to the lowermost rung 225 at its respective end 240 of structure 210. In a piston-cylinder implementation of linear actuator 214, the drive end 270 is connected to the movable piston. The mounting end 272 of linear actuator 214 is pivotally connected to a corresponding one of the pair of carriage devices 212 at a pivot joint 274 situated at an upper side of main section 250 of its associated carriage device 212. For this purpose, pivot joint 274 is configured with a pair of opposing, spaced-apart, upright flanges 276 and a shaft 278 extending between the pair of flanges 264 and defining a pivot axis. The mounting end 272 of linear actuator 214 is rotatably mounted to the shaft 278 of its corresponding pivot joint 274. In an exemplary form, pivot joint 274 is located intermediate the pair of pivot joints 260, 262.

Referring more particularly to FIG. 19, with continuing reference to FIGS. 16-17, the tarp attachment and towing structure 210 is capable of being deployed so as to undergo a continuous range of angular displacements in both the forward direction 280 and rearward direction 282 from an original upright position. In order to deploy the structure 210 in a fore condition corresponding to the forward direction of travel 280, the pair of rear pivot joints 262 of the pair of carriage devices 212 are first temporarily disabled by removing the relevant pivot pins 266 from the pair of rear pivot joints 262, thereby disconnecting rear side member 222 from its rotatable, mounting relationship to the pair of carriage devices 212. Next, the pair of linear actuators 214 are activated so that, in the piston-cylinder implementation of linear actuator 214, piston 218 extends from cylinder 216. This extension exerts a driving influence on structure 210 via the coupling of piston 218 to the lowermost rung 225 of structure 210, which causes the development of a turning moment experienced by structure 210 about the front rotational axis defined by the pair of front pivot joints 260, where the front side member 220 remains pivotally mounted to the pair of carriage devices 212. Since the rear side member 222 is disconnected and thereby free to move or swing out, the structure 210 responds to this turning moment by pivoting from the original upright position in the forward direction 280. Progressive extension of piston 218 of the pair of linear actuators 214 causes or induces structure 210 to continue pivoting in the forward direction 280. As shown, the linear actuator 214 is able to tandem pivot as needed to accompany and follow structure 210 as it pivots.

Alternately, in order to deploy the structure 210 in an aft condition corresponding to the rearward direction of travel 282, the pair of front pivot joints 260 of the pair of carriage devices 212 are first temporarily disabled by removing the relevant pivot pins 266 from the pair of front pivot joints 260, thereby disconnecting front side member 220 from its rotatable, mounting relationship to the pair of carriage devices 212. Next, the pair of linear actuators 214 are activated so that piston 218 extends from cylinder 216. This extension exerts a driving influence on structure 210 via the coupling of piston 218 to the lowermost rung 225 of structure 210, which causes the development of a turning moment experienced by structure 210 about the rear rotational axis defined by the pair of rear pivot joints 262, where the rear side member 222 remains pivotally mounted to the pair of carriage devices 212. Since the front side member 220 is disconnected and thereby free to move or swing out, the structure 210 responds to this turning moment by pivoting from the original upright position in the rearward direction 282. Progressive extension of piston 218 of the pair of linear actuators 214 causes or induces structure 210 to continue pivoting in the rearward direction 282. As shown, the linear actuator 214 is able to tandem pivot as needed to accompany and follow structure 210 as it pivots.

The structure 210 can be restored or returned to its original upright position by fully retracting piston 218, which induces structure 210 to pivot in the opposite direction from before and retrace the same rotary path back to the upright position. As shown in FIG. 19, when the frame structure 210 pivots in direction 280, the hingedly attached end (of structure 210) mounted on the opposite end of carriage device 212 from the end having the current axis of rotation is released. In particular, the hinged attachment at rear pivot joint 262 is released, in order to make the front axis of rotation at front pivot joint 260 available. As the linear actuator 214 pushes up (piston 218 extends), the frame structure 210 pivots, as shown, in direction 280. In order to return the as-pivoted structure 210 to its upright position, the linear actuator 214 pulls on structure 210 (piston 218 retracts). A similar, but opposite, arrangement takes places when the frame structure 210 pivots in the other direction 282.

The apparatus 200 provides a pivoting framework in the form of the tarp attachment and towing structure 210. The pivoting axis of structure 210 can be adjusted depending on the type of operation contemplated, which also correspondingly adjusts the possible direction of rotation. This adjustable feature is made possible by the configuration of structure 210 with a pair of selectively available pivoting axes. In particular, the pair of pivot joints 260, 262 at each one of the pair of carriage devices 212 defines a set of different (and parallel) pivot axes. The dual set of front pivot joints 260, one located at each one of the pair of carriage devices 212, defines a front pivot axis. Likewise, the dual set of rear pivot joints 262, one located at each one of the pair of carriage devices 212, defines a rear pivot axis. The structure 210 can pivot in the forward direction about the front pivot axis when the rear pivot axis is unavailable or disabled (i.e., pivot pins 266 of rear pivot joints 262 are removed); the structure 210 can pivot in the rearward direction about the rear pivot axis when the front pivot axis is unavailable or disabled (i.e., pivot pins 266 of front pivot joints 260 are removed).

In general, each side member 220, 222 is available to pivot when the set of pivot joints associated with the other, non-pivoting side member is temporarily disabled. A pair of linear actuators drivingly coupled to the pair of side members 220, 222 is used to create a turning moment and induce the pivoting action. The pair of pivot joints 260, 262 define a location where the structure 210 at front side member 220 and rear side member 222 is hingedly attached to the pair of carriage devices 212. This hinged attachment is selectively releasable by the use of removable pivot pins 266, although other conventional means of implementing this release function can also be employed.

Figure 21:
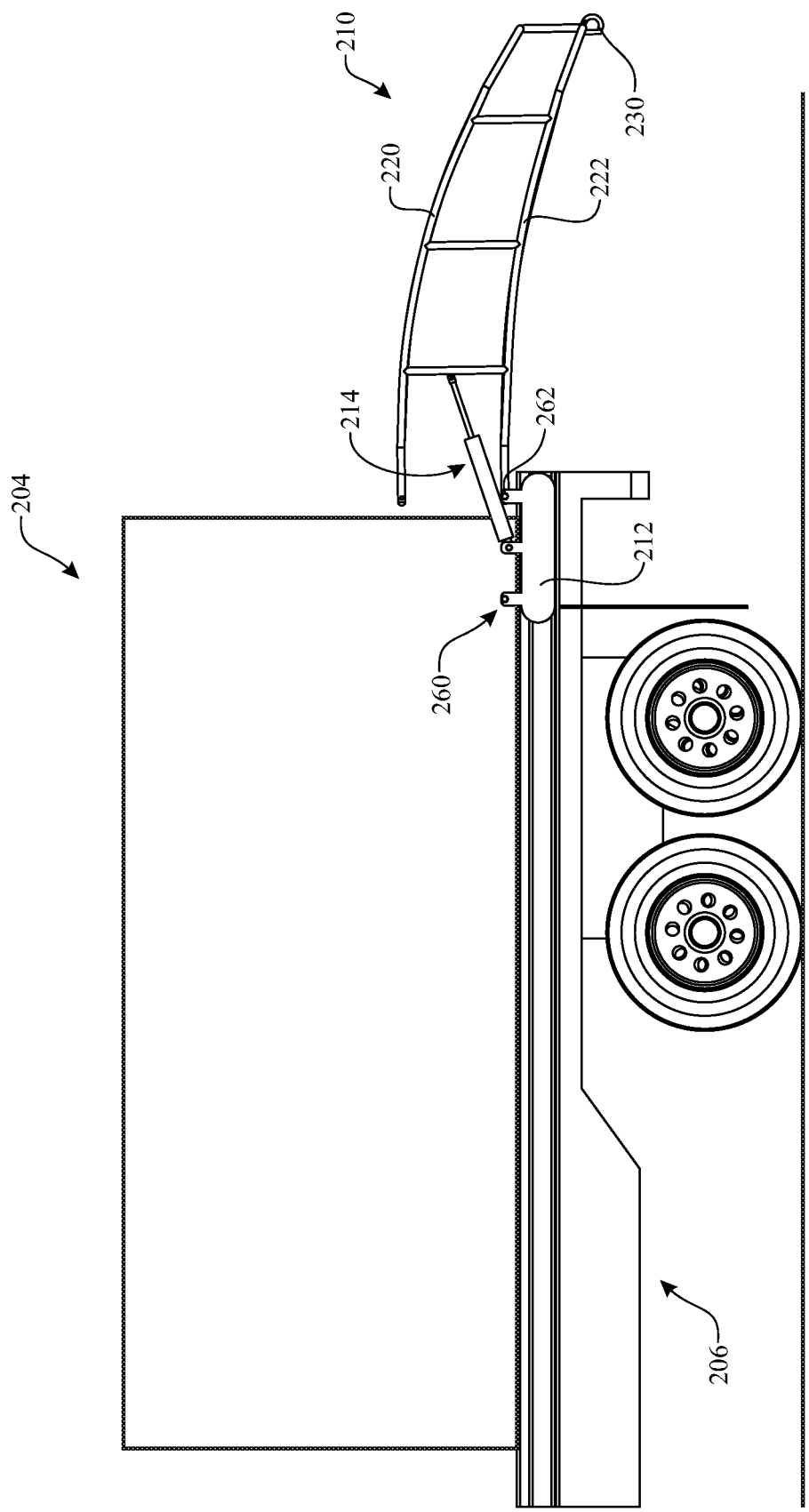
FIG. 21 presents a side elevation view of the mobile assembly, originally introduced in FIG. 15, illustrating its deployment at a rear location of the vehicle transport bed and the subsequent pivoting of the arched frame in the aft direction to put it in position to retrieve a leading edge of the cargo covering.

Referring now to FIGS. 21-24, the process for distributing covering 202 over cargo 204 is shown as a series of discrete, exemplary operations. First, the mobile apparatus 200 needs to retrieve the covering 202. The mobile apparatus 200 is initially positioned at a rear location of trailer bed 206 (FIG. 21). The mobile apparatus 200 is translated to this rear location by appropriate operation of the pair of carriage devices 212, if needed. The structure 210 is then deployed to undergo pivoting movement in the aft or rearward direction. In order to accomplish this, the dual set of front pivot joints 260 of the pair of carriage devices 212 are disabled, releasing the front side member 220 from its hinged attachment to the pair of carriage devices 212 and thereby freeing the front side member 220 to swing out. The structure 210 is then pivoted about the rear pivot axis defined by the dual set of rear pivot joints 262 of the pair of carriage devices 212. This pivoting action in the aft (rearward) direction occurs in response to appropriate operation of the pair of linear actuators 214. As shown in FIG. 21, the pivoted structure 210 extends away from the trailer bed 206 in a cantilevering-type orientation. In this position, structure 210 can retrieve covering 202 (not shown) by attachment via fasteners 230 attached to the leading edge of covering 202.

Figure 22:
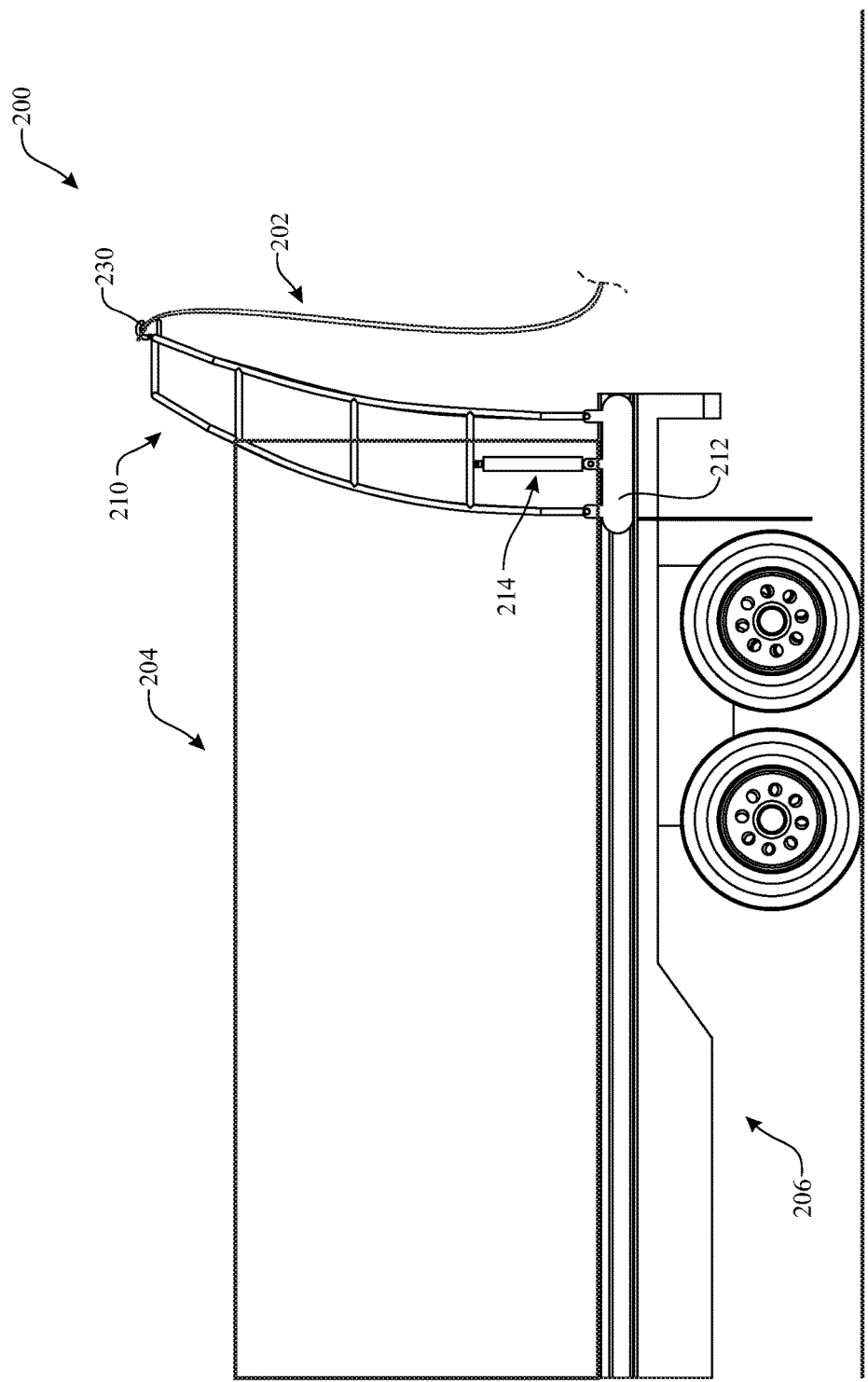
FIG. 22 presents a side elevation view of the mobile assembly, originally introduced in FIG. 15, illustrating the return of the arched frame to its upright position with the cargo covering in tow, following in sequence the operation depicted in FIG. 21.

Following the attachment of covering 202 to structure 210, the structure 210 is restored to its upright, standing position (FIG. 22). This procedure takes place by reversing the operation of the pair of linear actuators 214 from before, so that structure 210 experiences an opposite angular displacement to that it experienced previously in order to retrieve the covering 202. Once this is completed, the structure 210 is now in an upright position with covering 202 in tow, and ready to participate in the distribution of covering 202 over cargo load 204.

Figure 23:
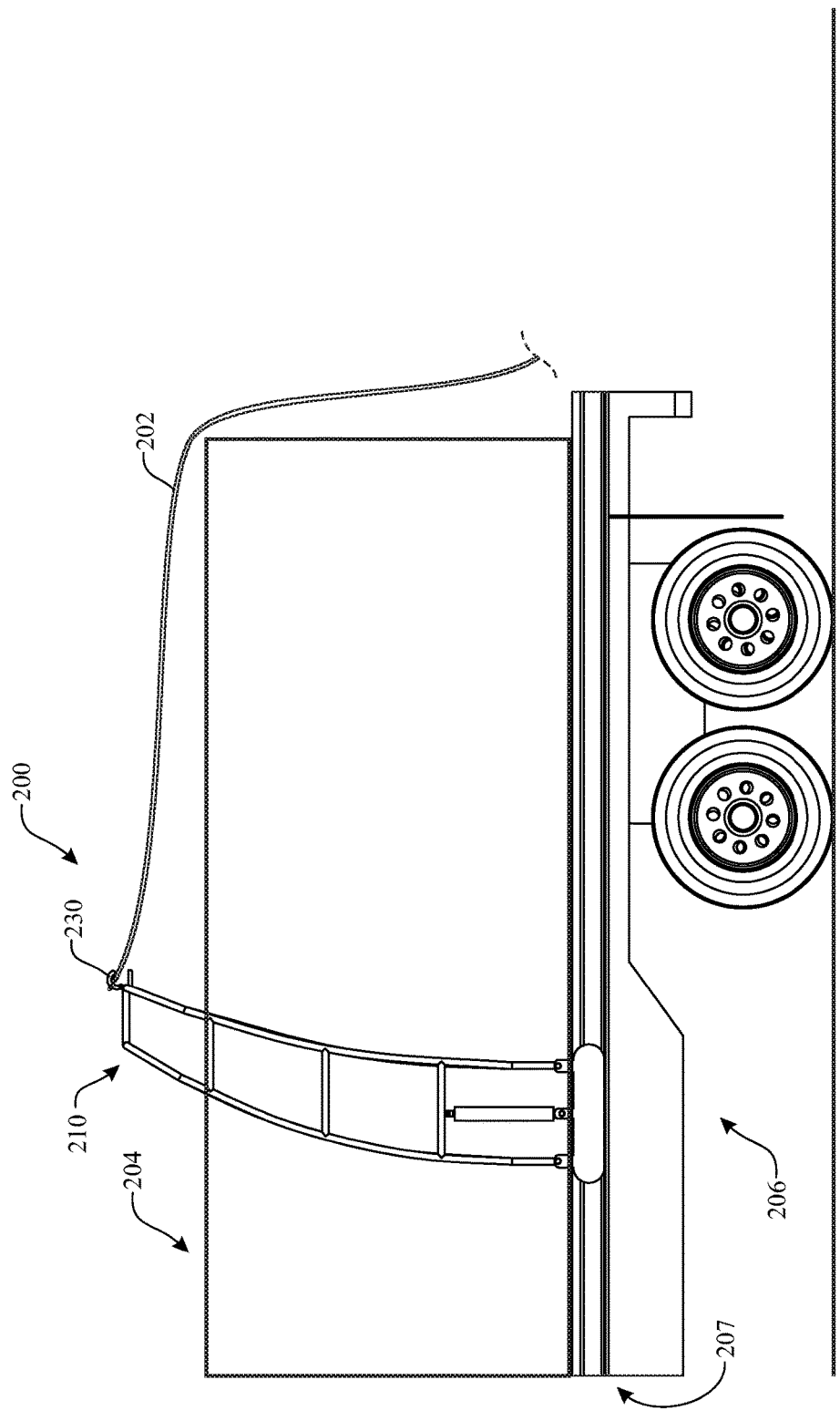
FIG. 23 presents a side elevation view of the mobile assembly, originally introduced in FIG. 15, illustrating travel of the mobile assembly towards the front of the bed and the accompanying advance of the cargo covering over the cargo load (shown partially covered), following in sequence the operation depicted in FIG. 22.
Figure 24:
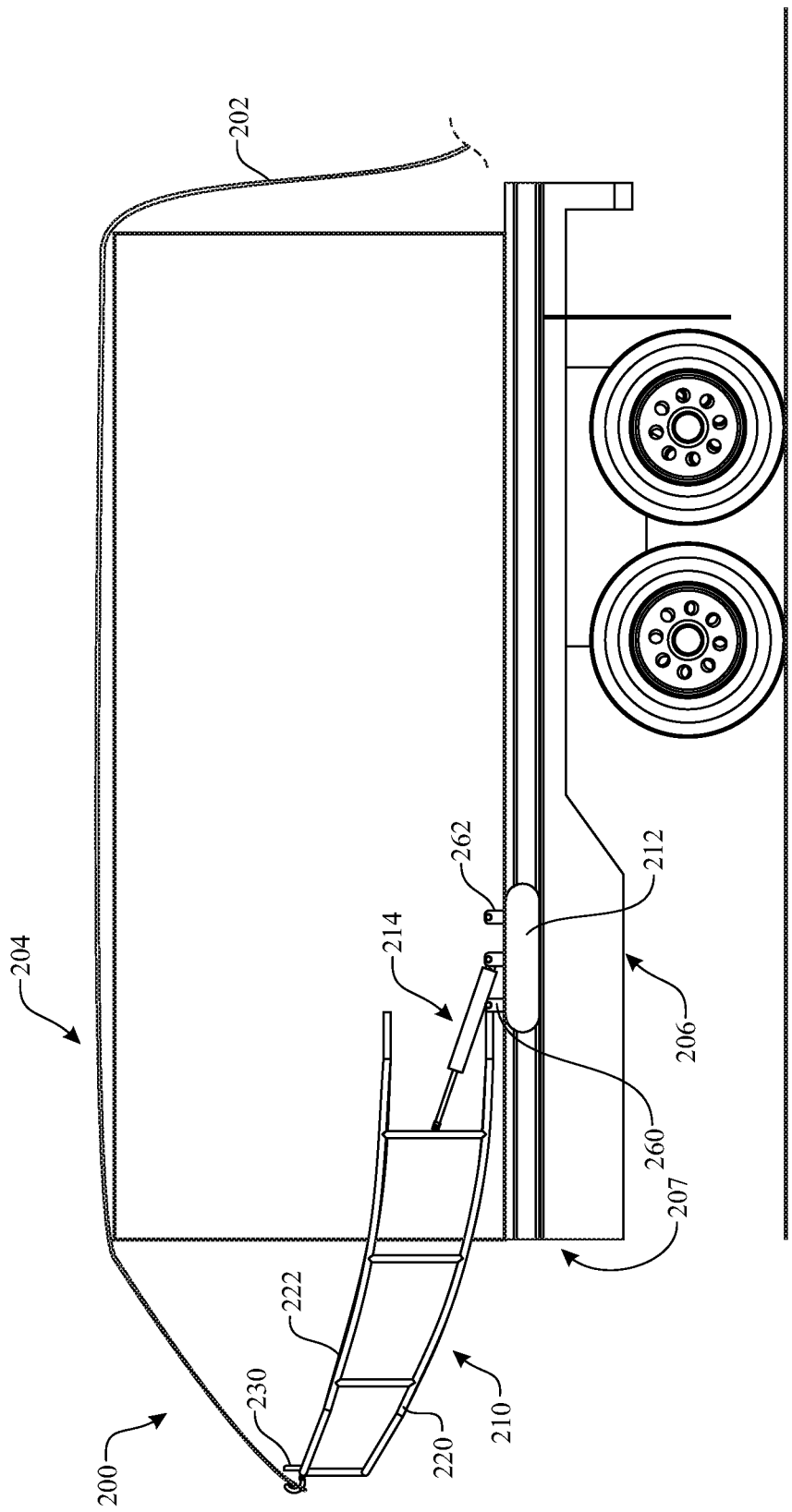
FIG. 24 presents a side elevation view of the mobile assembly, originally introduced in FIG. 15, illustrating pivoting of the arched frame in the fore direction to complete the covering of the cargo load (shown fully covered) and to put the arched frame in a storage position, following in sequence the operation depicted in FIG. 23.

Next, the mobile assembly 200 translates in the forward direction towards the front end 207 of trailer bed 206 (FIG. 23). As mobile assembly 200 translates, the covering 202 is likewise drawn forward due to its towing attachment to structure 210. In this manner, covering 202 is progressively draped or distributed over cargo load 204, as shown. In a final stage (FIG. 24), the structure 210 is pivoted in a forward direction in order to pull the covering 202 over and down past the leading section of cargo load 204 at the front end 207 of trailer bed 206, thereby fully extending covering 202 at least the full length of cargo load 204. In particular, structure 210 is deployed to undergo pivoting movement in the fore or forward direction. In order to accomplish this, the dual set of rear pivot joints 262 of the pair of carriage devices 212 are disabled, releasing the rear side member 222 from its hinged attachment to the pair of carriage devices 212 and thereby freeing the rear side member 222 to swing out. The structure 210 is then pivoted about the front pivot axis defined by the dual set of front pivot joints 260 of the pair of carriage devices 212. This pivoting action in the fore (forward) direction occurs in response to appropriate operation of the pair of linear actuators 214. From this pivoted position of structure 210, the quick-release feature of fasteners 230 enables the covering 202 to be released from attachment to structure 210, once the covering 202 is sufficiently draped over cargo load 204. Additionally, structure 210 can be stowed away for travel in this pivoted position by securing the front side member 220 in a saddle-type holding mechanism (not shown) or other suitable structure for maintaining structure 210 in place during travel of the tractor-trailer unit.

A controller (not shown) can be employed to manage the stroke action of the pair of linear actuators 214, i.e., the driving movement of piston 218. Additionally, a controller (not shown) can be employed to manage the operation of the pair of carriage devices 212. The operation of the pair of linear actuators 214 would be coordinated to act in concert with one another in identical manner. Likewise, the operation of the pair of carriage devices 212 would be coordinated to act in concert with one another in identical manner. The pair of carriage devices 212 would include appropriate mechanisms well known to those skilled in the art, such as a motor and drive gear assembly to operate the wheels. The power source for the pair of linear actuators 214 and the pair of carriage devices 212 would be supplied by the battery of the hauling tractor (truck), using suitable electrical connections. In one form, the management of the pair of linear actuators 214 and pair of carriage devices 212 is centralized in a single controller. For example, a hand-held device having suitable hardware and software could implement the control and management features. In a preferred form, communication with the individual components of mobile apparatus 200 is accomplished using wireless technology, in which case the operator may use a wireless transceiver to communicate the appropriate commands for controlling the operation of apparatus 200.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A mobile assembly for use in drawing a covering at least partially over a load located on the bed of a transport vehicle trailer, said mobile assembly comprising:
   a mobile conveyance system configured to selectively move along a longitudinal dimension of the transport vehicle bed;
   a structure defining a clearance relative to the load and further defining a point of selectively attachable connection to the covering, the structure mounted to the conveyance system in an adjustable mounting relationship defined by a pair of selectively available pivoting axes; and
   an actuation system configured to selectively maneuver the structure such that the structure undergoes a pivoting motion.

2. The assembly as recited in claim 1, wherein the structure includes:
   a pair of ends each mounted to the conveyance system in a respective mounting relationship defined by a pair of selectively attachable pivoting connections.

3. The assembly as recited in claim 1, wherein the conveyance system further comprises:
   a pair of carriage devices each associated with a respective one of a pair of tracks each adjacent to and extending at least partially along a corresponding side of the transport vehicle bed, each one of the pair of carriage devices capable of travel along its respective associated track.

4. The assembly as recited in claim 3, wherein the structure further includes:
   a pair of elongate, spaced-apart side members each having a pair of ends each selectively pivotally connected to a corresponding one of the pair of carriage devices; and
   a plurality of spaced-apart transverse members extending between the pair of side members.

5. The assembly as recited in claim 4, wherein the actuation system further includes:
   a pair of linear actuators each pivotally mounted at a first end to a corresponding one of the pair of carriage devices and connected at a second end to a respective one of the plurality of transverse members.

6. The assembly as recited in claim 3, wherein each one of the pair of carriage devices respectively includes:
   an elongated main member; and
   a pair of wheels each mounted on a corresponding one of a pair of axles attached to one of a pair of opposite ends of said elongated main member and extending laterally therefrom, the pair of wheels disposed for travel in the associated track.

7. The assembly as recited in claim 3, wherein each one of the pair of carriage devices respectively includes:
   a pair of spaced-apart pivot joints at which the structure is releasably, pivotally connected to the carriage device at a corresponding one of the pair of ends of the structure.

8. The assembly as recited in claim 4, further comprises:
   a plurality of spaced-apart fastening devices connected to one of the pair of side members, each fastening device configured to enable a releasable attachment to the covering.

9. The assembly as recited in claim 2, wherein the actuation system further includes:
   a pair of actuators each drivingly coupled to a respective one of the ends of the structure to selectively cause the structure to experience pivoting movement.

10. The assembly as recited in claim 1, wherein the structure further includes:
    a pair of elongate, spaced-apart side members each having a pair of ends each selectively pivotally connected to the conveyance system to define a respective one of the pair of selectable pivoting axes; and
    at least one transverse member extending between the pair of side members.

11. The assembly as recited in claim 10, wherein the conveyance system further comprises:
    a pair of carriage devices each associated with a respective one of a pair of tracks each adjacent to and extending at least partially along a corresponding side of the transport vehicle bed, each one of the pair of carriage devices capable of travel along its respective associated track;
    wherein each one of the pair of side members is pivotally connected at each one of its respective pair of ends to a corresponding one of the pair of carriage devices to define a corresponding selectively attachable pivoting connection.

12. The assembly as recited in claim 11, wherein the actuation system further includes:
    a pair of linear actuators each pivotally mounted at a first end to a corresponding one of the pair of carriage devices and connected at a second end to a respective one of the at least one transverse member.

13. The assembly as recited in claim 4, wherein the pair of side members defines an arch-like profile.

14. A mobile assembly for use in drawing a covering at least partially over a load located on the bed of a transport vehicle trailer, said mobile assembly comprising:
    a pair of carriage devices each associated with a respective one of a pair of tracks each adjacent to and extending at least partially along a corresponding side of the transport vehicle bed, each one of the pair of carriage devices capable of travel along its respective associated track;
    a pair of elongate, spaced-apart side members each having a pair of ends each pivotally connected to a corresponding one of the pair of carriage devices to define a corresponding selectively attachable pivoting connection;
    at least one transverse member extending between the pair of side members; and
    an actuation system configured to selectively maneuver the pair of side members such that a selectable one of the pair of side members undergoes a pivoting motion.

15. The assembly as recited in claim 14, wherein the actuation system further includes:
    a pair of linear actuators each pivotally mounted at a first mounting end to a corresponding one of the pair of carriage devices and connected at a second drive end to a respective one of the at least one transverse member.

16. The mobile assembly as recited in claim 14, wherein each one of the pair of carriage devices respectively includes:
    an elongated main member; and
    a pair of wheels each mounted on a corresponding one of a pair of axles attached to one of a pair of opposite ends of said elongated main member and extending laterally therefrom, the pair of wheels disposed for travel in the associated track.

17. The assembly as recited in claim 14, further comprises:
    a plurality of spaced-apart fastening devices connected to one of the pair of side members, each fastening device configured to enable a releasable attachment to the covering.

18. A method of distributing a covering over a freight loaded on the bed of a transport vehicle trailer, comprising the steps of:
    providing a frame structure that spans a lateral dimension of the trailer bed, the frame structure defining a clearance relative to the freight, the frame structure further defining a pair of selectively available pivoting axes including a front first pivot axis enabling pivoting of the frame structure in a forward direction and a rear second pivot axis enabling pivoting of the frame structure in a rearward direction;
    attaching the covering to the frame structure; and
    moving the frame structure along a longitudinal dimension of the bed to facilitate distribution of the covering over the freight.

19. The method of claim 18, wherein the attaching step further includes the steps of:
    positioning the frame structure at a rear location of the trailer bed;
    pivoting the frame structure about the rear second pivot axis to a degree enabling retrieval of the covering from a source location thereof;
    engaging the covering with the frame structure while the frame structure is pivoted about the second rear pivot axis; and
    pivoting the frame structure about the rear second pivot axis to return the frame structure to a generally upright position.

20. The method of claim 19, further includes the steps of:
    pivoting the frame structure about the front first pivot axis, following movement of the frame structure along the longitudinal dimension of the bed; and
    releasing the covering from attachment to the frame structure.

* * * * *